(12) United States Patent
Tran et al.

(10) Patent No.: US 7,623,474 B2
(45) Date of Patent: Nov. 24, 2009

(54) TECHNIQUES FOR DISTRIBUTING INFORMATION USING MULTICAST SUBSETS

(75) Inventors: Thuan Van Tran, Cary, NC (US); Yi Yang, Morrisville, NC (US); Liem Nguyen, San Jose, CA (US); Russell White, Holly Springs, NC (US); Donnie Van Savage, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 552 days.

(21) Appl. No.: 11/353,544

(22) Filed: Feb. 14, 2006

(65) Prior Publication Data

US 2007/0192451 A1  Aug. 16, 2007

(51) Int. Cl.
H04L 12/26 (2006.01)

(52) U.S. Cl. ........................... 370/255; 370/390
(58) Field of Classification Search ............... 370/390, 370/432; 709/238–244
See application file for complete search history.

(56) References Cited

U.S. PATENT DOCUMENTS

| | | | |
|---|---|---|---|
| 6,182,147 B1 | 1/2001 | Farinacci | |
| 6,269,085 B1 | 7/2001 | Provino et al. | |
| 6,529,882 B1 | 3/2003 | Park et al. | |
| 6,785,275 B1 * | 8/2004 | Boivie et al. | 370/390 |
| 2002/0194361 A1 * | 12/2002 | Itoh et al. | 709/233 |
| 2003/0147386 A1 * | 8/2003 | Zhang et al. | 370/390 |
| 2006/0168341 A1 * | 7/2006 | Keller-Tuberg | 709/242 |
| 2008/0031187 A1 * | 2/2008 | Draves et al. | 370/328 |

OTHER PUBLICATIONS

B. Cain, et al., Internet Group Management Protocol, Version 3, rfc3376.txt, Oct. 1, 2002, Publisher: www.ietf.org, Published in: Internet, 53pp.

* cited by examiner

Primary Examiner—Kwang B Yao
Assistant Examiner—Alex Skripnikov
(74) Attorney, Agent, or Firm—Patent Capital Group

(57) ABSTRACT

Techniques for sending data in a packet-switched communications network include determining multiple subsets of adjacent network nodes of the network. The adjacent network nodes communicate without intervening network nodes with a particular network node through an interface on the particular network node. Each subset includes multiple adjacent network nodes. Subset definition data is sent through the interface. The subset definition data indicates which adjacent network nodes belong to which subset. Data for fewer than all adjacent network nodes in all subsets are sent by including, in a multicast data packet sent over the interface with a multicast destination address, subset identifier data that indicates a particular subset. When such data is received by a node, it is discarded unless the subset identifier matches the receiving node's subset identifier. Among other effects, this allows routing messages to be more efficiently sent to better performing neighboring network nodes.

32 Claims, 13 Drawing Sheets

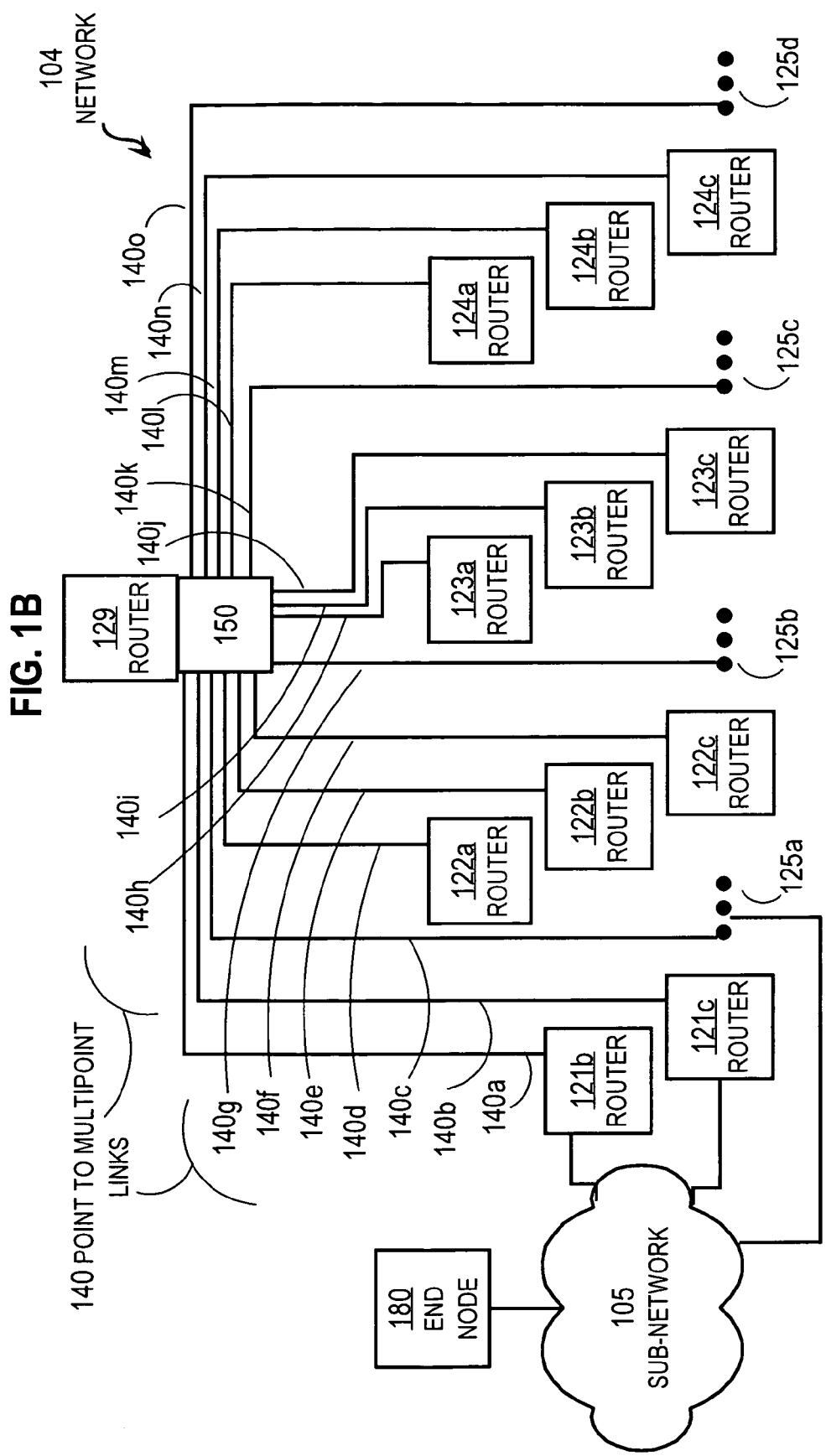

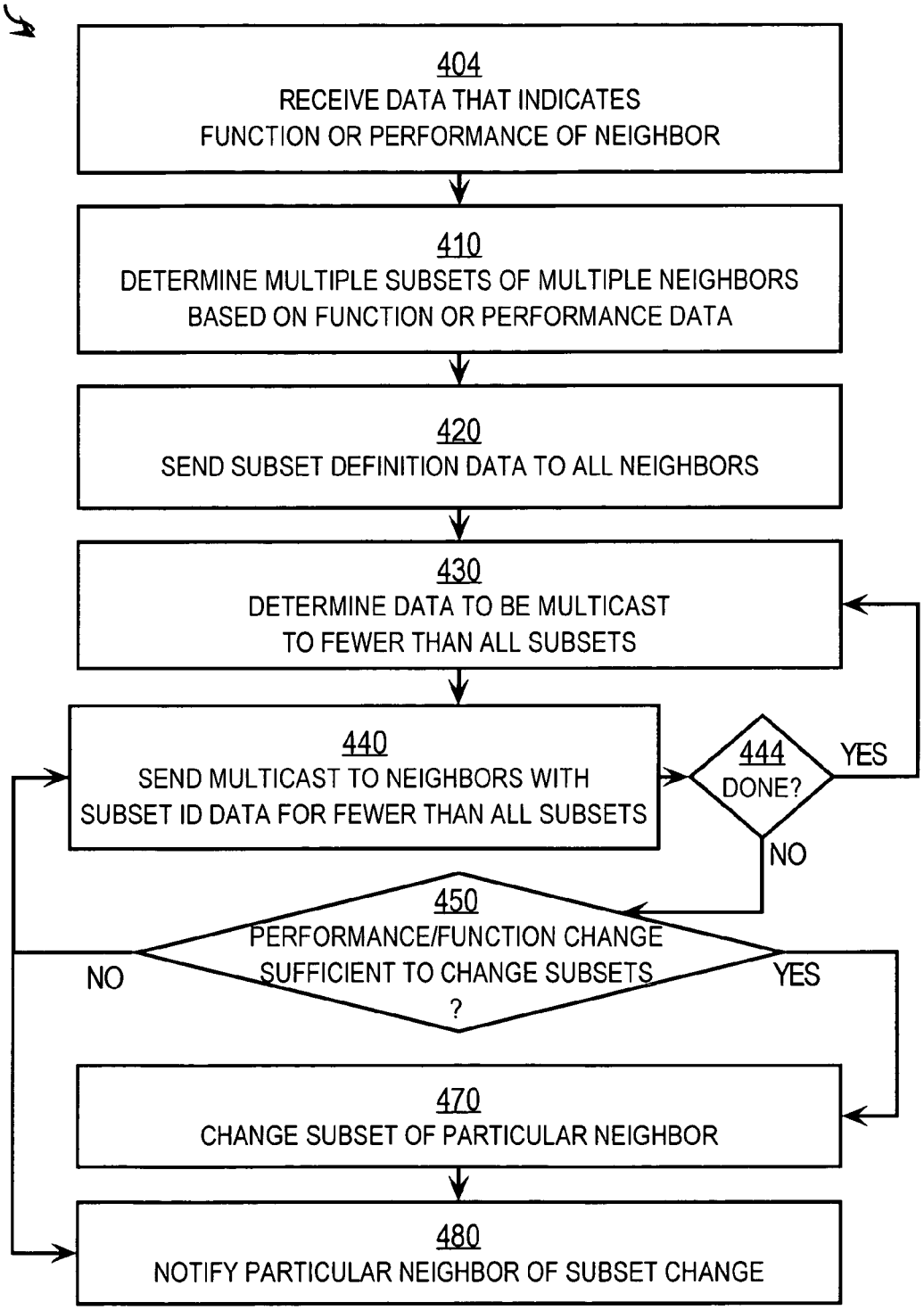

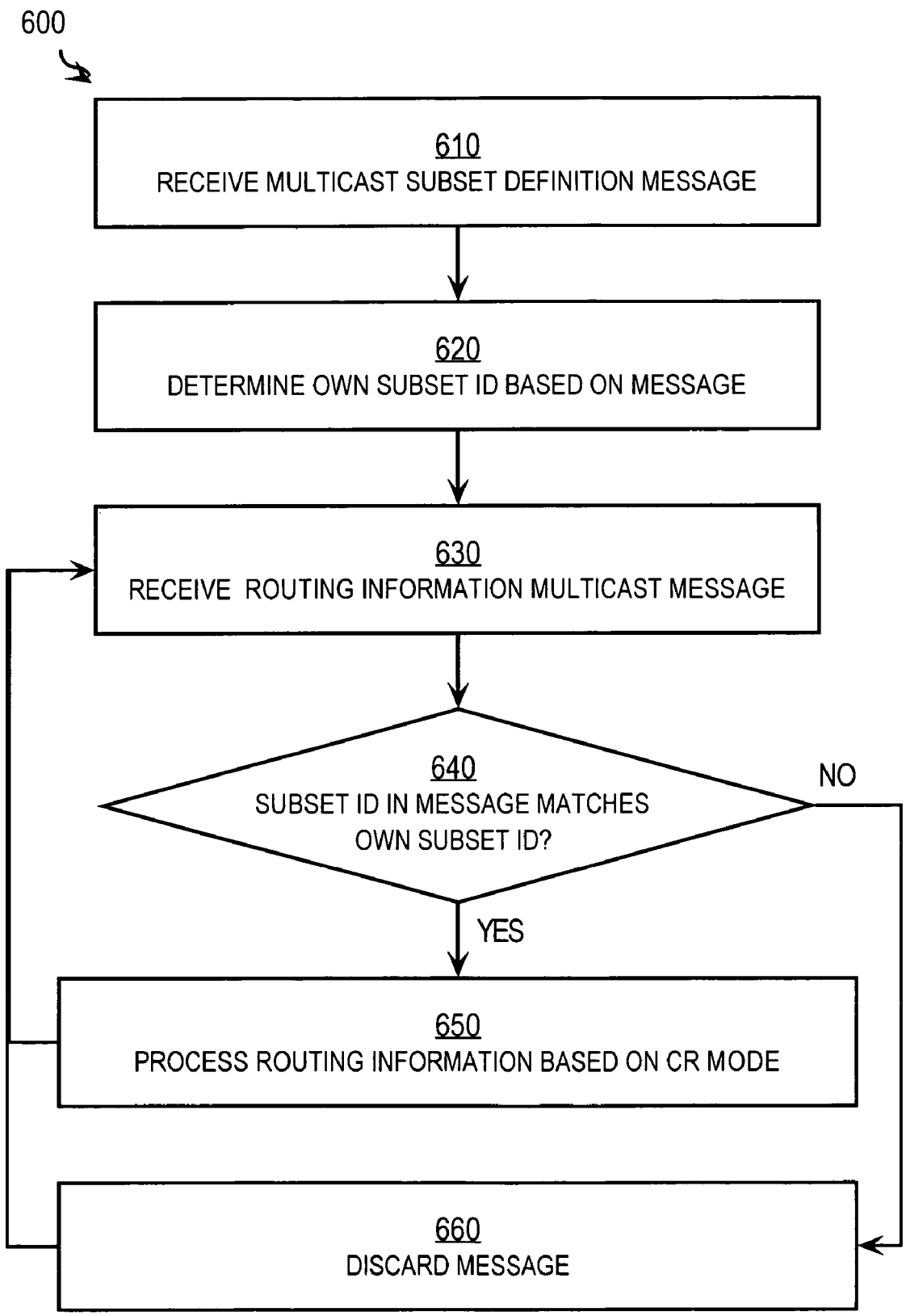

TECHNIQUES FOR DISTRIBUTING INFORMATION USING MULTICAST SUBSETS

BACKGROUND OF THE INVENTION

1. Field of the Invention

The present invention relates to using multicasts to distribute information to multiple nodes in a network; and in particular to using multicast subsets to improve performance during distribution of routing information among adjacent nodes.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets (also called messages herein) according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange. For many protocols, the destination of a packet can include data that indicates a unique identifier for a particular destination node, such as a network address, and the packet is termed a unicast packet; or the destination can include a special code that indicates the packet is directed to any recipient node, and the packet is termed a "multicast" packet. Such a special code is called the multicast destination code.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A routing protocol only exchanges control plane messages used for routing data packets sent in a different routed protocol (e.g., IP). A portion of a network under the network administration of a single authority, such as an enterprise or Internet service provider (ISP) is called a domain or an autonomous system (AS). To reduce the consumption of network resources and improve scalability, some routing protocols send only sumnmarized routing information. Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols such as the intermediate system to intermediate system (IS-IS) protocol and the open shortest path first (OSPF) protocol. Another IGP, developed by Cisco Systems of San Jose, Calif. for use in its routers, is the Enhanced Interior Gateway Routing Protocol (EIGRP). Some of the link-state protocols divide an autonomous system into multiple areas, flood all data for a unified routing database within an area, but send only summarized information between areas. Some IGPs, like EIGRP, send only summary information from each intermediate network node in the autonomous system.

EIGRP currently uses reliable multicast to transport routing information between a sending network node and all its adjacent neighbor nodes (sometimes called neighbors or peers) over one or more interfaces on the sending node. This reliable multicast system relies on the sending router sending a single multicast data packet, and waiting for some specified period of time called a multicast flow time (learned dynamically through network operation), for the neighbors that have received the routing information to acknowledge receipt of the information with an acknowledgement (ACK) data packet. Because receipt of the multicast data packet is acknowledged by the recipients with an ACK data packet, the multicast is called a reliable multicast.

If a neighbor does not acknowledge the receipt of this information within the multicast flow time, the neighbors that have replied are placed in a special state, called the conditional receive state, so they may continue to receive routing information through multicasts. Other routers are informed to ignore the additional multicasts.

That is, instead of waiting for all ACK messages before sending the next multicast, EIGRP paces multicast packets on the one or more interfaces with its neighbors using a timer called a multicast flow timer. The value indicated in the multicast flow timer is derived from the mean Smooth Round Trip Time (SRTT) of all neighbors on an interface. When there are large number of neighbors which have a wide range of SRTTs, the multicast flow timer value is large, forcing EIGRP to pace the multicast packets very slowly. As a result, the faster neighbors are penalized by the slower neighbors.

Under normal condition, EIGRP waits for acknowledgements from all neighbors before sending the next reliable multicast packet. If the multicast flow timer expires and EIGRP is ready to send the next packet when only a subset of neighbors have acknowledged the previous multicast packet, EIGRP enters a Multicast Exception condition. Under this condition, EIGRP continues to send the next multicast packet rather than waiting for all ACK messages. A method called Conditional-Receive (CR) is invoked to instruct the laggard neighbors to not accept the next multicast packet which is intended for the faster neighbors. Normal multicast resumes when the laggard neighbors catch up.

CR works by multicasting a special hello packet (sometimes called an unreliable hello packet because an ACK message is not returned by the recipient) to the neighbors. The unreliable hello packet has a variable-length data field holding data that indicates the addresses of the laggard neighbors and the sequence number of the next reliable multicast packet. The special unreliable hello packet is also called a sequenced hello. The next reliable multicast packet is sent with the CR bit set and has the same sequence number specified in the sequenced hello. This special reliable multicast packet is called a CR packet. The laggard neighbors that have the matching addresses specified in the sequenced hello discard the CR packet without further processing. The faster neighbors go into the CR mode and accept the CR packet. Unicast packets without the CR bit are sent to the laggard neighbors until they catch up.

This mechanism works well in networks where a single router can reach all the neighbors attached to a single interface through a link that is similar in speed for each of those neighbors, and when these links are relatively lossless, and bandwidths are relatively high compared to the amount of routing information to be transferred.

However, on networks with a large number of neighbors, reachable through links with varying speeds, this system presents a number of problems, including the following.

(1) CR divides the neighbors into two subsets, a multicast subset and a unicast subset. This is not efficient when there are many neighbors on an interface. The increased number of neighbors increases the range of travel times and increases the average travel time, thus increasing the value of the multicast flow timer. Many fast neighbors may be penalized by waiting too long for the multicast flow timer.

(2) However, if the flow timer is set at a smaller value, EIGRP frequently invokes the CR method and increases the number of laggard routers. When the number of laggard neighbors is large, unicasting the same routing information to many of them is not efficient. As EIGRP is required to support thousands of neighbors per interface, it clearly requires a more efficient delivery method.

(3) When there are many neighbors on an interface, the list of laggard neighbor addresses in the sequenced hello may become large. The interface maximum transmission unit (MTU), which specifies the maximum size of a data packet on an interface, may not be large enough for the sequenced hello to contain all needed neighbor addresses. EIGRP currently only supports an MTU of 1500 bytes which has enough room for less than 300 neighbor addresses. As a result, EIGRP replicates a packet that indicates a sequence number to be ignored by a laggard neighbor and unicasts the packet to each laggard neighbor that has an address that is not included in the multicast sequenced hello.

(4) The large sequenced hello packets contribute to interface congestion and router load when processing long lists of neighbor addresses.

Based on the foregoing, there is a clear need for techniques to multicast routing information, which techniques do not suffer one or more deficiencies of past approaches. In particular, there is a need to reduce laggard neighbors of a sending node to fewer than 300 to properly implement CR in EIGRP and to reduce the congestion on a link caused by a large number of unicasts to laggard routers. There is also a particular need to shorten the value in the multicast flow timer for the fastest neighbors of a sending node.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that illustrates a portion of a network that includes a large number of neighboring routers on a point to multi-point link, according to an embodiment;

FIG. 4A is a flow diagram that illustrate at a high level a method for using multicast subsets, according to an embodiment;

FIG. 6 is a flow diagram that illustrates a method for receiving a multicast data packet with a subset identifier, according to an embodiment.

DETAILED DESCRIPTION

Techniques are described for sending data among multiple neighbors in a packet-switched communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of sending routing information for EIGRP within an autonomous system using a conditional receive (CR) mechanism to feed routing information to fast routers more rapidly than to slow routers. However, the invention is not limited to this context and protocol, but may be applied in any protocol that sends information to a large number of neighbors on a network segment without intervening intermediate network nodes.

1.0 Network Overview

Figure 1A:
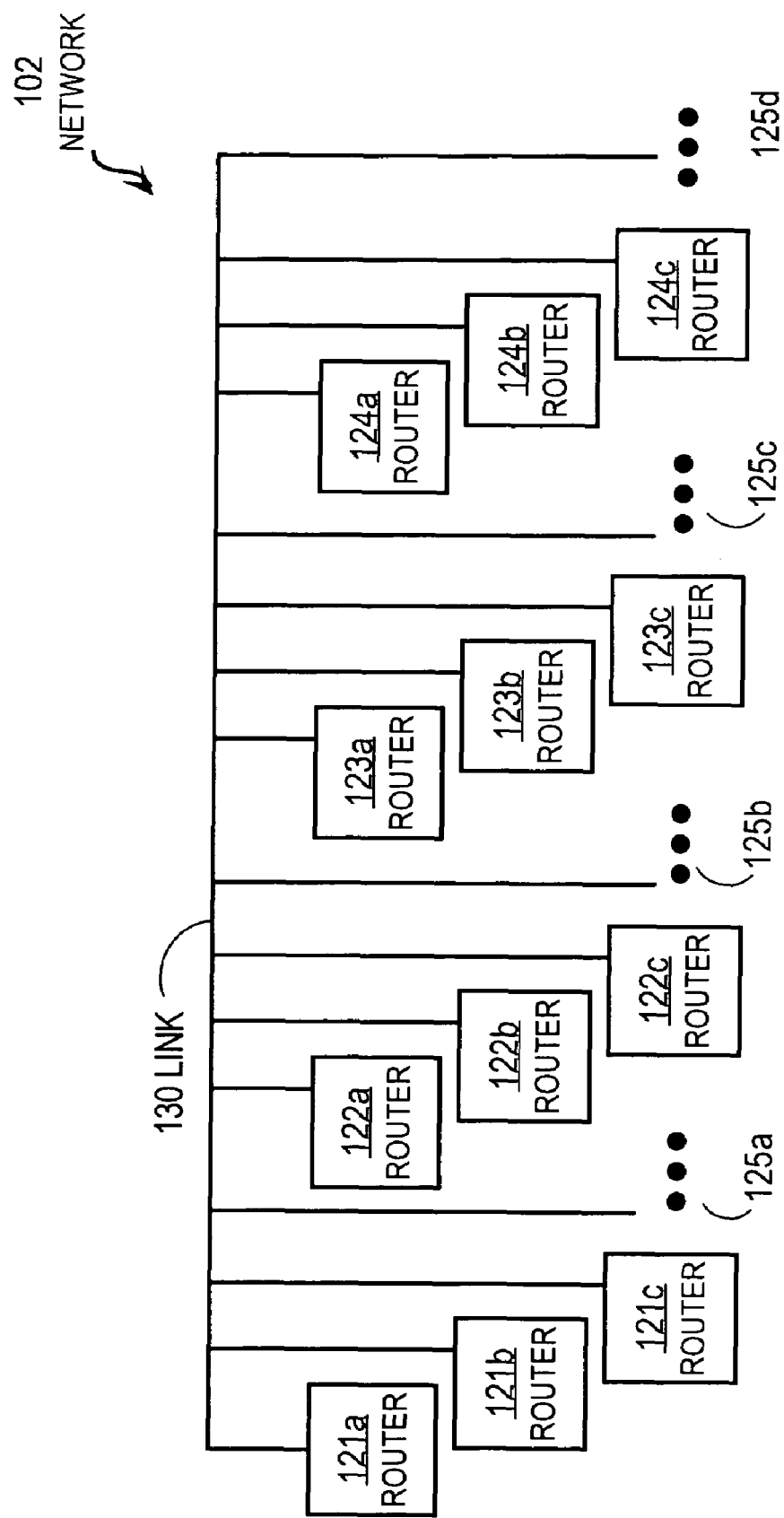
FIG. 1A is a block diagram that illustrates a portion of a network that includes a large number of neighboring routers, according to an embodiment.

FIG. 1A is a block diagram that illustrates a portion of a network 102 that includes a large number of neighboring routers, according to an embodiment. Network 102 includes a large number of intermediate network nodes: router 121a, router 121b, router 121c, router 122a, router 122b, router 122c, router 123a, router 123b, router 123c router 124a, router 124b, router 124c and further routers represented by ellipses 125a, 125b, 125c, 125d, collectively referenced hereinafter as routers 120. The routers 120 are connected by communication links 130 on which there are no intervening intermediate network nodes (called a network segment). Thus routers 120 are neighbors. While a certain number of nodes 120 and links 130 are depicted in network 102 for purposes of illustration, in other embodiments, a network includes more or fewer nodes, such as routers and end nodes that are not neighbors of routers 120, and more or fewer links.

A message multicast by one neighbor, e.g., router 121a may incur a variable amount of cost to reach each of the other neighboring routers 120 on network segment made up of links 130. Cost can be measured in any manner known in the art including bandwidth, travel time, signal attenuation and susceptibility to noise, among others, or any combination of such factors. Due to noise or congestion on the segment, some routers may not receive the multicast at all For purposes of illustration it is assumed that the cost to reach a neighbor of router 121a is measured in round trip travel time, and increases with distance to the right from router 121a in FIG. 1A. It is assumed that all routers indicated by ellipses 125a are closer than router 122a to router 121a. Similarly, it is assumed that all routers indicated by ellipses 125b, 125c are closer than routers 123a, 124a, respectively, to router 121a. It is further assumed, for purposes of illustration, that router 122b fails to receive the multicast at all.

When a reliable multicast is sent by router 121a to all its neighboring routers 120, the neighboring routers 120 return an ACK message. By timing the arrival of the ACK messages, router 121a can determine the round-trip travel time (RTT) to each neighboring router 120. By accumulating RTTs from several reliable multicast messages, the router 121a can determine a Smooth RTT (SRTT) for each neighboring router 120. The SRTT is defined as an exponentially decreasing weighted average, so that measured values of RTT are given progressively less influence as they increase.

As described in the background section, EIGRP determines a multicast flow time (MFT) based on the range of SRTT values for all the neighboring routers 120. For purposes of illustration, it is assumed that the MFT is set to a value that is greater than the SRTT of routers 125b but less than the SRTT of router 123a. It is further assumed that router 121a has 1000 neighbors, and that ellipses 125a, 125b, 125c, 125d represent 298 routers, 297 routers, 197 routers, and 197 routers, respectively. It is further assumed that MFT is one second.

Then, when router 121a determines to send a series of EIGRP update messages to its neighbors, it sends the first message in the series (e.g., with sequence number 123) in a reliable multicast over its interface to links 130. After the MFT of 1 second, all routers from which router 121a did not receive an ACK message are listed in a sequenced hello message that also indicates the next sequence number of the next update message in the series (e.g., sequence number 14123). Then router attempts to send a sequenced hello message that indicates sequence number 14123 and lists 401 routers that indicate router 122b, router 123a and routers more distant than router 123a. The listed routers do not process the next update message in the series. The router then sends the next update message in the series in a reliable multicast to be processed just by those routers not listed in the sequenced hello (e.g., routers 121b through routers represented by ellipsis 125a excluding router 122b).

As described in the background section, only 300 routers can be listed and thus routers 124a through routers represented by ellipsis 125d are not notified that they are laggard and they attempt to process the second update message multicast. Some of them get the second update message out of sequence or otherwise without benefit of the first update message, and their attempt to update their routing tables are subject to error.

Even if fewer than 300 neighboring routers 120 are laggards, so there is no error in routers not being aware they are laggards, the method involves one multicast and up to 300 unicasts per message in the update message series. The multiple unicasts consume network resources, including bandwidth on the segment and processing power on router 121a.

Each of the neighboring routers 120 on the segment formed by links 130 in network 102 has a thousand neighbors and each of these routers face similar burdens in sending updates to its neighbors.

FIG. 1B is a block diagram that illustrates a portion of a network 104 that includes a large number of neighboring routers on a point to multi-point link, according to an embodiment. In network 104 router 121a of network 102 is replaced by router 129 with a point to multipoint interface 150. The links 130 are replaced by point to multipoint links 140 to the remaining routers 120 of network 102. In the illustrated embodiment, the point-to-multipoint links include link 140a, link 140b, link 140c, link 140d, link 140e, link 140f, link 140g, link 140h, link 140i, link 140j, link 140k, link 140l, link 140m, link 140n, and link 140o. Unlike network 102, in which each router 120 has a thousand neighbors, in network 104 only router 129 has a thousand neighbors. The other routers 120 each have just a few neighbors. Links 140 form a network segment.

Network 104 also includes sub-network 105 connected to end node 180 and links between sub-network 105 and neighboring routers 121b, 121c, and routers indicated by ellipsis 125a.

FIG. 1B is included to illustrate another example when it is desirable to send a routing message to a large subset of neighboring routers on a network segment. For example, if router 121*b* is the next hop on routes from router 129 to end node 180, and router 121*b* or link 140*a* fails, then router 129 issues a routing protocol message called a query to find another route to end node 180. Routers that include router 122*a* through routers indicated by ellipsis 125*d* do not have alternate paths to end node 180 and are considered stub nodes with regard to end node 180. It is unfruitful to issue protocol query messages to these nodes. Rather, it is desirable to send the query messages only to routers 121*c* and the 298 routers indicated by ellipsis 125*a*. Using current approaches, router 129 must either send a multicast over interface 150 that is processed by all 999 remaining routers, including 700 stub routers, or must send 299 unicasts to non-stub routers 121*c*, and routers indicated by ellipsis 125*a*. Both approaches waste considerable segment bandwidth and processing power on either router 129 or the stub routers.

According to illustrated embodiments of the invention, as described in more detail in the following sections, a router determines multiple subsets of multiple neighboring routers that are appropriate for certain routing messages, notifies the neighboring routers of which subsets they belong to, and then issues multicast messages with subset identifiers that are processed only by members of the identified subsets. In this way, routing messages are directed to large subsets of neighboring routers without resorting to large numbers of unicasts, or wasteful processing at unintended recipients of multicasts. In other embodiments, other protocols use multicast subsets on a network segment to reduce waste of network resources on the segment or recipient network nodes.

2.0 Data Structures for Routing Information

Figure 2A:
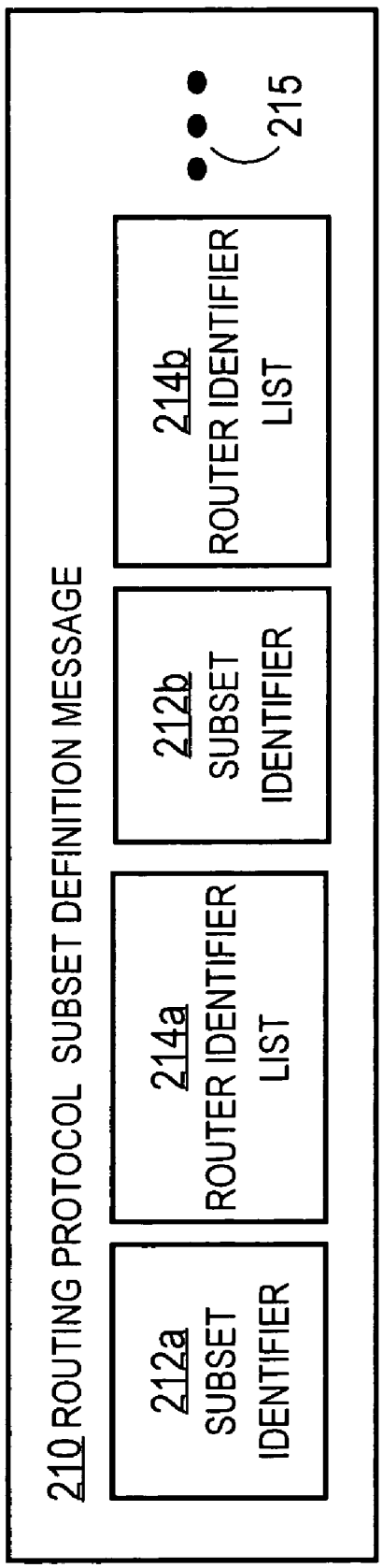
FIG. 2A is a block diagram that illustrates a control plane multicast message for a routing protocol, which defines multicast subsets among neighboring routers, according to an embodiment.

FIG. 2A is a block diagram that illustrates a control plane multicast message 210 for a routing protocol, which defines multicast subsets among neighboring routers, according to an embodiment. Control plane message 210 includes a subset identifier field 212*a* and a router identifier list field 214*a*. In the illustrated embodiment, the message 210 includes a second subset identifier field 212*b* and a second router identifier list field 214*b*. Ellipsis 215 indicates additional pairs of subset identifier fields and associated router identifier lists. In other embodiments, more or fewer pairs of subset identifier field and router identifier list field are included in message 210. Although data fields are shown in FIG. 2A and subsequent figures as integral blocks of data in a particular arrangement for purposes of illustration, in other embodiments the fields or portions thereof may be included in the messages in a different order.

The subset identifier fields 212*a*, 212*b* among others indicated by ellipsis 215, collectively referenced hereinafter as subset identifier fields 212, each holds data that indicates a particular subset of multiple neighbors in an IP multicast. In the illustrated embodiment, each subset identifier field holds a unique integer, such as a 32 bit integer. An IP multicast is identified by a unique value in an IP destination address field of an IP header. An IP address is a four byte number typically written for human consumption as four decimal integers, each in the range from 0 to 255, separated by periods. For example an IP multicast for all hosts on a network segment is indicated by an IP destination address of 224.0.0.10.

The router identifier list fields 214*a*, 214*b* among others indicated by ellipsis 215, collectively referenced hereinafter as router identifier list fields 214, each holds data that indicates a list of multiple routers that belong to the subset indicated in the associated subset identifier field 212. In the illustrated embodiment, each router identifier list field 214 holds a list of multiple IP addresses of the routers or router interfaces on the segment, which are members of the associated subset. The list field 214*a* is most likely a variable length field, which is frequently included in messages, e.g. using a type-length-value (TLV) field.

In some embodiments, the MTU of the routing protocol limits the number of IP addresses that can be packed into one data packet to a maximum number N. In some such embodiments, the number of routers permitted in one subset and associated with one subset identifier is also limited to the number N in order to ensure that all members of the subset can be listed in the same data packet. In some embodiments, several routing protocol subset definition messages 210 are sent from a router in order to specify all members of all subsets.

The multicast definition message 210 differs from the messages of the Internet Group Management Protocol (IGMP). IGMP manages multicast groups by determining and distributing multicast IP addresses and associating multicast group attributes with each multicast IP address. Also IGMP determines membership based on groups a listening end node wants to belong to, rather than getting broadcasts from a transmitting router that defines membership. IGMP is described at the time of this writing in a Request for Comments (RFC) document of the Internet Engineering Task Force (IEFT) identified as RFC 3376 available in file rfc3376.txt in directory rfc of Internet World Wide Web domain ietf.org. More specifically, message 210 differs from IGMP in that the subset identifier fields 212 are in a payload of a multicast data packet that uses a multicast IP destination address, whether an IP address that indicates all hosts on a network segment, or a multicast address defined within IGMP. The subset identifier field 212 holds data that indicates a subset of the nodes associated with the multicast IP address in the destination address of the IP header.

Figure 2B:
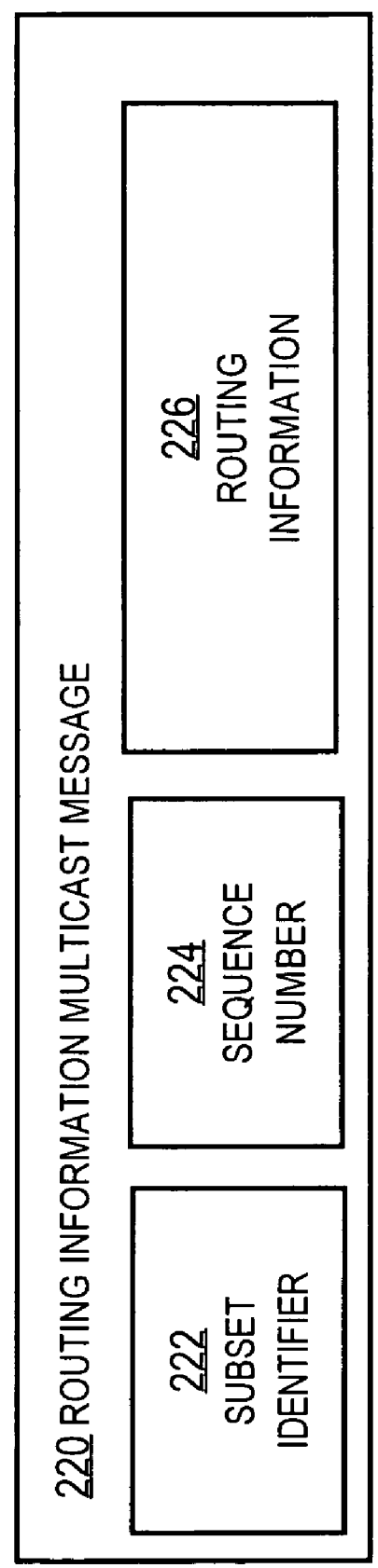
FIG. 2B is a block diagram that illustrates a control plane multicast message for a routing protocol, which provides routing information to a particular multicast subset, according to an embodiment.

FIG. 2B is a block diagram that illustrates a control plane multicast message 220 for a routing protocol, which provides routing information to a particular multicast subset, according to an embodiment. Control plane message 220 includes a subset identifier field 222, a sequence number field 224, and a routing information field.

The subset identifier field 222 holds data that indicates a set of one or more subset identifiers for subsets whose member routers are to receive the routing information included in the message 220. Because message 220 is a multicast, all neighboring routers on a segment receive the message 220. The contents of field 222 indicate which of those recipients are to process the information. A router that is not a member of any subset indicated in the subset identifier field 222 discards the message 220 without further processing.

The sequence number field 224 holds data that indicates the order of the message 220 in a series of messages used to convey routing information, such as the cumulative number of bytes (1 byte typically equals 8 binary digits called bits) of the entire update included in the current message 220. It is often the case that all routing update information, for example, does not fit within the MTU limits of the routing protocols, and therefore several messages are sent to convey all the routing update information. The routing update information is properly processed in the order it is sent. The contents of the sequence number field ensure that the recipient router can determine the proper sequence for processing the routing update information and detect the loss of any bytes.

The routing information field 226 holds data that indicates the next portion of the routing information, such as a routing table update or a routing query.

Figure 2C:
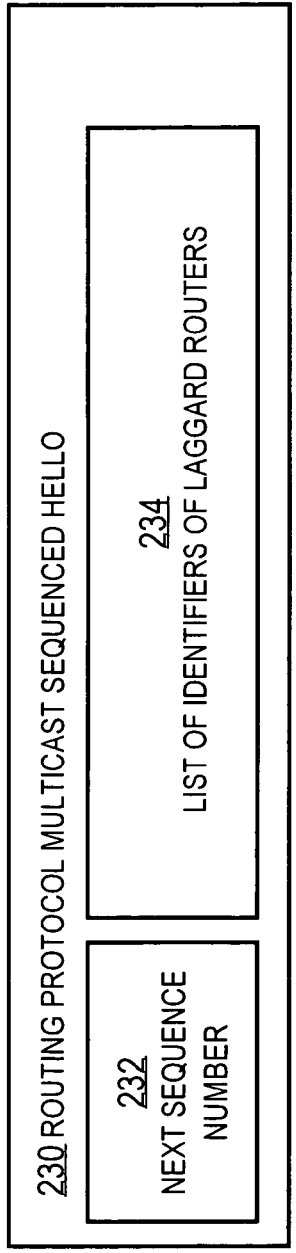
FIG. 2C is a block diagram that illustrates a control plane multicast message for a routing protocol, which indicates laggard routers which will not participate in conditional receiving of routing information beyond a give sequence number.

FIG. 2C is a block diagram that illustrates a control plane multicast message 230 for a routing protocol, which indicates laggard routers which will not process conditional routing information beyond a give sequence number, according to the sequenced hello message described in the background section. As described in the background section, message 230 includes a next sequence number field 232 and a list of identifiers of laggard routers field 234. The next sequence number field 232 holds data that indicates a sequence number that will not be processed by the laggard routers from a multicast. The list of identifiers of laggard routers field 234 is a variable length field that holds data that indicates identifiers, such as IP addresses, of routers that are not to process multicasts of routing information with sequence number indicated in field 232 or later sequence numbers.

Figure 2D:
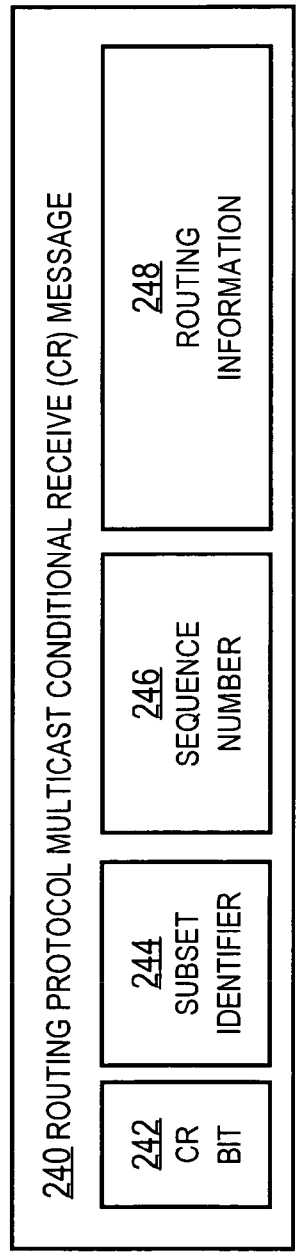
FIG. 2D is a block diagram that illustrates a control plane multicast message for a routing protocol, which includes routing information for conditional receipt by fast routers in a multicast subset, according to an embodiment.

FIG. 2D is a block diagram that illustrates a control plane multicast message 240 for a routing protocol, which includes routing information for conditional receipt by fast routers in a multicast subset, according to an embodiment. Message 240 includes a CR bit field 242, a subset identifier field 244, a sequence number field 246 and a routing information field 248.

The CR bit field 242 holds a bit that indicates the multicast message is intended only for those members of a subset in conditional receive mode, i.e., for those routers not listed in a sequenced hello message 240. The subset identifier field 244 holds data that indicates the subset for which the multicast is intended. Routers in other subsets discard message 240, regardless of whether those routers are in a conditional receive mode. In the illustrated embodiment, described in more detail in a later section, the subset identifier field 244 holds data indicating a single subset. In some embodiments, the subset identifier field 244 holds data indicating more than one subset, but fewer than all subsets. The sequence number field 244 holds data that indicates the sequence number for the routing information included in the message 240; and is used by routers listed in a sequenced hello to determine whether to process this multicast message or not. The routing information field 248 holds data that indicates the next portion of the routing information, such as a routing table update or a routing query.

Message 240 is similar to CR multicasts currently used in EIGRP, except that message 240 includes the subset identifier field 244 to indicate fewer than all subsets in the multicast group, e.g., fewer than all subsets of all hosts on the network segment indicated by multicast address 224.0.0.10, or fewer that all subsets of hosts indicated by some other multicast address.

Figure 2E:
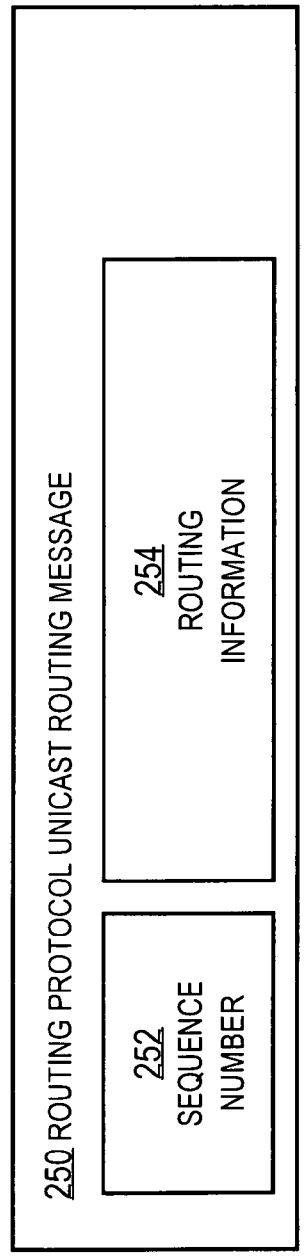
FIG. 2E is a block diagram that illustrates a control plane unicast message for a routing protocol, which includes routing information for receipt by a laggard router.

FIG. 2E is a block diagram that illustrates a control plane unicast message 250 for a routing protocol, which includes routing information for receipt by a laggard router. Message 250 is identical to unicasts currently used in EIGRP for laggard routers. Message 250 includes a sequence number field 252 and a routing information field 254.

The sequence number field 252 holds data that indicates the sequence number for the routing information included in the message 250; and typically repeats a sequence number used in a multicast message processed by more responsive routers. The routing information field 254 holds data that indicates the portion of the routing information missed by the laggard router, such as a portion of a routing table update or a routing query.

Figure 3A:
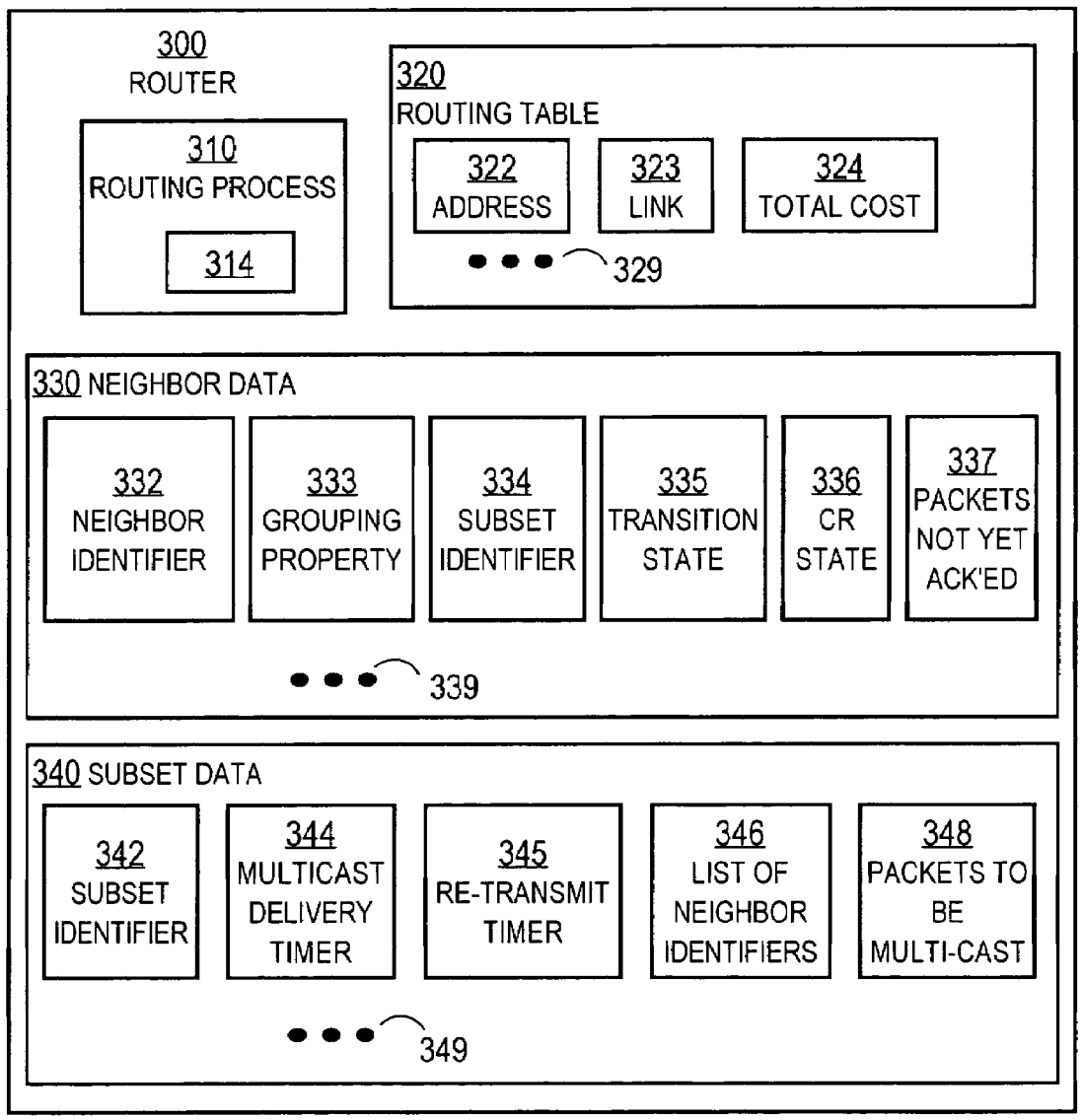
FIG. 3A is a block diagram that illustrates a router that uses the control plane messages depicted in FIG. 2A, 2B, 2C, 2D, 2E, according to an embodiment.

FIG. 3A is a block diagram that illustrates a router that uses the control plane messages depicted in FIG. 2A, 2B, 2C, 2D, 2E, according to an embodiment. Router 300 includes a routing process 310, a routing table 320, a neighbor data structure 330 and a subset data structure 340.

The routing process 310 executes on a processor, such as a general purpose processor executing sequences of instructions that cause the processor to perform the routing process.

According to embodiments of the invention, routing process includes process 314 to process subset information as described in more detail below with respect to FIG. 4A, FIG. 4B, FIG. 4C, FIG. 5A or FIG. 5B. The routing process 310 stores and retrieves information in the routing table 320 based on information received in one or more routing protocol update messages that are stored in routing protocol information data structures (including neighbor data structure 330 and subset data structure 340 among others, not shown).

The routing table 320 is a data structure that includes for each destination that can be reached from the router 300, an address field 322, a link field 323 and zero or more attribute fields. In the illustrated embodiment, the attributes fields include a total cost field 324. The address field 322 holds data that indicates a destination address or range of addresses that can be reached by router 300, e.g., an IP address for end node 180. The link field 323 indicates link on router 300 that is used as the next hop to reach the destination address indicated in field 322. For example, link 140a with router 121b is the link for the next hop from router 129 to end node 180 and data indicating link 140a is included in link field 323. The total cost field 324 holds data that indicates a cost metric to reach the destination address from router 300. Fields for other destinations in routing table 320 are indicated by ellipsis 329.

The neighbor data structure 330 is a data structure that holds data that describes each neighbor of the router 300. In the illustrated embodiment, neighbor data structure 330 includes, for each neighbor, a neighbor identifier field 332, a grouping property field 333, a subset identifier field 334, a transition state field 335, a CR state field 336, and information packets not yet acknowledged field 337. In some embodiments other data fields (not shown) are also associated with each neighbor. Fields for other neighbors are indicated by ellipsis 339.

The neighbor identifier field 332 holds data that indicates a particular neighboring router, e.g., an IP address for that particular neighbor.

The grouping property field 333 holds data that indicates a property of the neighbor used to determine subsets. For example, in some embodiments, the grouping property field 333 includes data that indicates total cost metric for the neighbor. In some embodiments, the grouping property field holds data that indicates a number M of the most recently observed round trip travel times with the neighbor between multicasts and acknowledgment messages. In the illustrated embodiment, the grouping property field 333 holds data that indicates the SRTT for that neighbor. In some embodiments field 333 holds data that indicates whether the neighbor is a stub or non-stub router for one or more ranges of destination addresses. If a given neighbor can never transit traffic to destinations behind a specific router, it can be considered a stub neighbor.

The subset identifier field 334 holds data that indicates a unique identifier for the subset, e.g., a 32 bit integer. In some embodiments, the type of router (e.g., stub or non-stub) is used as a grouping property; and a different integer is used for each type. In such embodiments, the group identifier field 334 and the grouping property field 333 are redundant. In some such embodiments, the grouping property field 333 is omitted. In some embodiments, the neighbors in a subset are determined by a list in the subset data structure 340, described below, and subset identifier field 334 is omitted.

In some circumstances a neighbor can also transmit subset definition data that is different. In some embodiments, subset identifier field 334 holds data that indicates a subset identifier for router 300 assigned by a transmitting neighbor indicated in field 332 in a routing protocol group definition message 210 received from that neighbor. In some embodiments, subset identifier field 334 holds data that indicates both the subset identifier defined by router 300 for the neighbor and the subset identifier defined by the neighbor for router 300.

The transition state field 335 holds data that indicates whether a neighbor is transitioning from one subset to a different subset, as described below with reference to FIG. 5A.

The CR state field 336 holds data that indicates whether the neighbor is in a conditional receive (CR) state for receiving multicasts not received by laggard routers in the same subset.

The information packets not yet acknowledged field 337 holds data that indicates a queue of routing information and sequence numbers that have been sent to but not yet acknowledged by the particular neighbor indicated in field 332. In various embodiments, the queue itself, or a pointer to a memory location that contains the queue, is included in field 337. If not acknowledged in time, the data in this queue is unicast to that neighbor, as described in the background section.

The subset data structure 340 is a data structure that holds data that describes each subset defined by router 300. In the illustrated embodiment, subset data structure 340 includes, for each subset, a subset identifier field 342, a multicast delivery timer field 344, a re-transmit timer field 345, a list of neighbor identifiers field 346, and a field 348 for a queue of packets to be multicast for the subset. Fields for other subsets are indicated by ellipsis 349.

The subset identifier field 342 holds data that indicates a particular subset, e.g., a unique 32 bit integer, as described above. The multicast delivery timer field 344 holds data that indicates how long the router 300 waits until it sends another multicast for this subset and is based on a SRTT for the neighbors included in the subset identified in field 342. The re-transmit timer field 345 holds data that indicates how long the router 300 waits until it sends unicasts to neighbors of the subset which have not yet acknowledged a reliable multicast sent for the subset with routing information. The multicast delivery timer field 344 and re-transmit timer field 345 are similar to such fields currently used in EIGRP for a multicast, but fields 344 and 345 apply just to a particular subset of the multicast recipients using a particular multicast address, and not to all multicast recipients.

The list of neighbor identifiers field 346 is a variable length field that holds data that indicates the neighbors included in the subset. For example, IP addresses of neighbors included in the subset are listed in the field 346. In some embodiments, a neighbor's membership in a subset is indicated by the contents in field 334 associated with each neighbor, and field 346 is redundant. In some such embodiments, field 346 is omitted. In some such embodiments, field 346 is retained because it provides some efficiency in determining the members of a subset when there are many subsets.

The field 348 for a queue of packets to be multicast for the subset holds data that indicates sequence numbers and routing information queued to be sent to the subset indicated in field 342. In some embodiments, field 348 holds a pointer to a memory location where the queue is stored; and, in some embodiments, field 348 itself holds the queue, in whole or in part. Note that different subsets may next receive routing information with different sequence numbers based on the use of different values in the timer fields 344, 345, as described in more detail below.

Data structures may be formed in any method known in the art, including using portions of volatile memory, or non-volatile storage on one or more nodes, in one or more files or in one or more databases accessed through a database server, or some combination. Although data structures 320, 330, 340 are shown as integral blocks with contiguous fields in a particular order for purposes of illustration, in other embodiments one or more portions of fields and data structures 320, 330, 340 are stored as separate data structures in the same or different order on the same or different multiple nodes that perform the functions of router 300.

According to various embodiments of the invention, router 300 tracks multiple subsets of neighbors that use the same multicast address in order to reduce the number of laggard routers, reduce the penalty paid by the fastest neighbors, reduce the size of sequenced hellos, reduce the number of unicast messages to bring laggard routers up to date, or reduce the waste of network resources to send queries, or some combination.

In some embodiments, router 300 defines one subset to include only routers that are stubs for a certain destination and a different subset that includes only routers that are not stubs for that destination. For example, with reference to FIG. 1B, routers 121b, 121c and routers indicated by ellipsis 125a have routes to end node 180 that do not loop back through router 129. Therefore router 129 places these routers in a non-stub subset of routers reached by multicasts on point-to-multipoint links 140 to IP address 224.0.0.10. The remaining routers are placed in a different subset. Then, when the route from router 129 to end node 180 through router 121b is lost, router 129 senda a multicast query (message 220) on links 140 with a subset identifier in field 222 associated with non-stub routers for destination 180. Routers 122b through 124c and routers indicated by ellipses 125b, 125c, 125d discard this multicast query because those routers are not part of the non-stub subset. Thus these stub routers are spared the load of processing the multicast query (and the propagation of the query to further levels of the network 104); and, consequently, network resources are conserved. Alternatively, router 129 is spared the load of generating 299 unicast query messages to routers 121c and routers indicated by ellipsis 125a.

Note that, in some embodiments, a different set of stub and non-stub subsets are defined for some different destinations or destination ranges.

In some embodiments, router 300 defines different subsets for routers that are based on ranges of cost to reach those routers. For example, in some embodiments, routers are associated with subsets based on smooth round-trip travel time (SRTT).

Figure 3B:
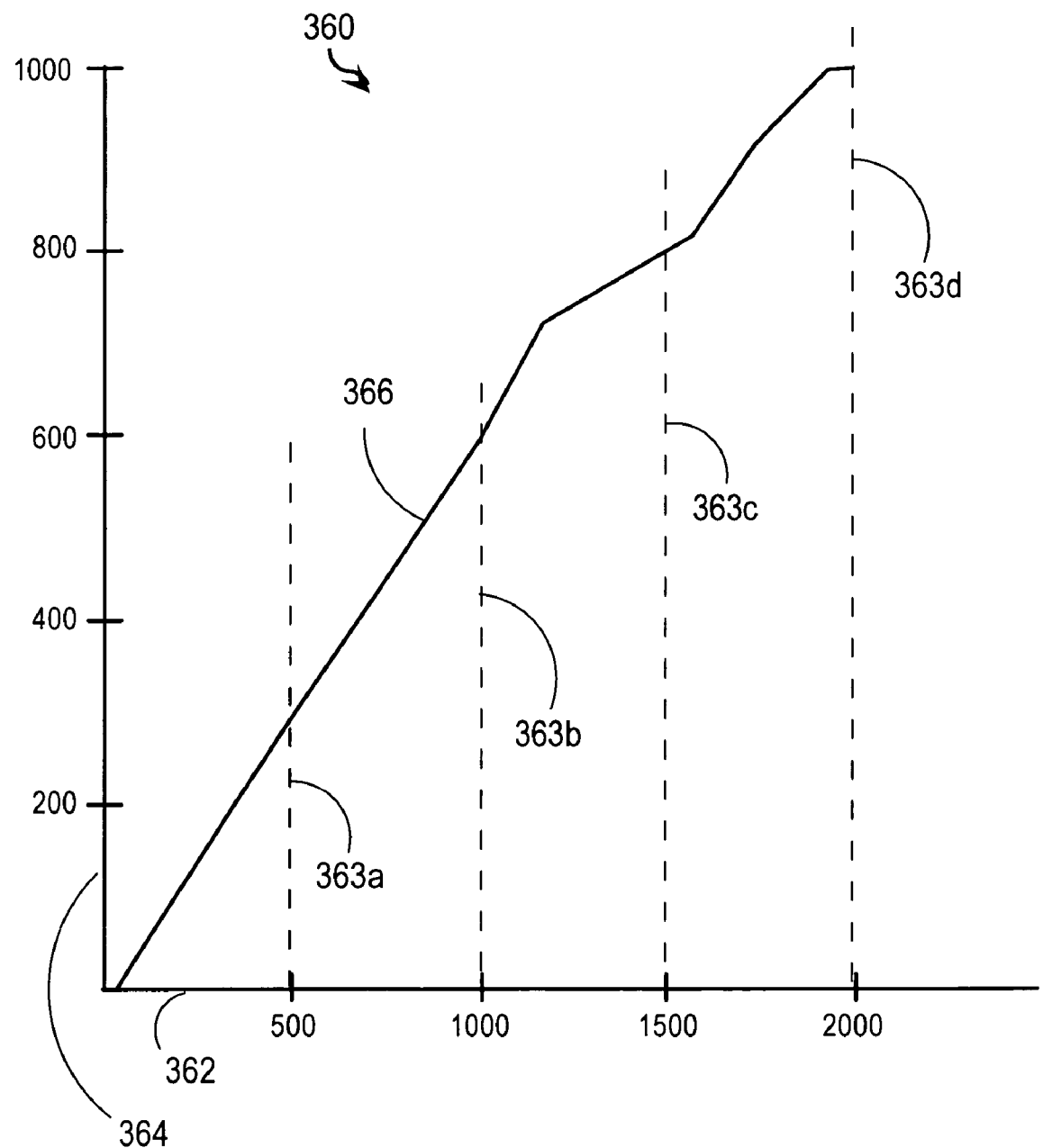
FIG. 3B is a graph that illustrates subsets of neighboring routers that are used by the router of FIG. 3A, according to an embodiment.

FIG. 3B is a graph 360 that illustrates formation of subsets of neighboring routers used by the router of FIG. 3A, according to an embodiment. Horizontal axis 362 indicates SRTT in milliseconds (1 millisecond, ms, $=10^{-3}$ seconds). The vertical axis 364 indicates a number of neighboring routers on network segment of links 130. The trace 366 indicates the number of neighboring routers that have SRTT values less than or equal to a given SRTT. For example vertical dashed line 363a indicates a SRTT of 500 ms. Dashed line 363a intersects trace 366 at a value of 300, indicating that 300 neighboring routers have a SRTT less than or equal to 500 ms. Similarly, vertical dashed lines 363b, 363c, 363d at times 1000 ms, 1500 ms, and 2000 ms intersect trace 366 at values of 600, 800, and 1000, respectively.

In the illustrated example embodiment, router 121a divides its 1000 neighboring routers into four subsets, with subset identifiers 1001, 1002, 1003, 1004. Subset identifier 1001 include 300 neighbors with SRTT values from more than 0 up to 500 ms; subset identifer 1002 includes 300 neighbors with SRTT values from more than 500 up to 1000 ms; subset identifer 1003 includes 200 neighbors with SRTT values from more than 1000 up to 1500 ms; and subset identifier 1004 includes 200 neighbors with SRTT values from more than 1500 and 2000 ms (2 seconds). The multicast delivery timers for these subsets are set to 500 ms, 1000 ms, 1500 ms, and 2000 ms, respectively.

For purposes of illustration, it is assumed that router 121a has routing information to be shared with all its neighbors that involves five data packets with sequence numbers 123, 14123, 28123, 42123, 56123. For purposes of simple illustration it is assumed in this paragraph that there are no laggard routers. The time and sequence numbers of multicasts sent by router 121a in this example is given in Table 1.

TABLE 1

Multicast routing information send schedule for first example embodiment.

| Time (ms) | IP multicast address | Subset ID | Sequence number |
|---|---|---|---|
| 0 | 224.0.0.10 | none (all subsets) | 123 |
| 500 | 224.0.0.10 | 1001 | 14123 |
| 1000 | 224.0.0.10 | 1001 | 28123 |
| | 224.0.0.10 | 1002 | 14123 |
| 1500 | 224.0.0.10 | 1001 | 42123 |
| | 224.0.0.10 | 1003 | 14123 |
| 2000 | 224.0.0.10 | 1001 | 56123 |
| | 224.0.0.10 | 1002 | 28123 |
| | 224.0.0.10 | 1004 | 14123 |

As shown in Table 1, during the 2 seconds it takes router 121a to send the second data packet (through sequence number 14123) to the more distant subset (subset ID 1004), router 121a has sent all five data packets (through sequence number 56123) to the fastest neighbors (subset ID 1001); and has sent three data packets (through sequence number 28123) to the next fastest neighbors (subset ID 1002); and has sent two data packets (through sequence number 28123) to the two next fastest neighbors (subset IDs 1002 and 1003). To complete the transmission, router 121a sends 20 multicasts (five multicasts to each of four subsets). To these 20 multicasts should be added four multicasts to define the subsets (assuming for simplicity that 300 router IP addresses can be fit within the MTU for the routing protocol). The four defining multicasts are amortized over many routing update messages and the average number of multicasts for routing updates involving 5 data packets would quickly approach 20 multicasts.

Compare the results of Table 1 to the prior EIGRP approach of selecting one multicast delivery timer for the whole segment, e.g., at 1000 ms. After 2000 ms, only two packets would be sent to the fastest neighbors, and only one packet sent to the third fastest. Using four subsets, four packets are delivered to the fastest neighbors and two packets to the third fastest. To complete the transmission using the current approach, router 121a is required to send 500 unicasts for each of the second through fifth data packets. Thus router 121a and the network segment of links 130 would be heavily loaded to send 5 multicasts and 2000 unicasts, rather than the 20 multicasts and no unicasts when four subsets are defined.

A few laggards among routers in the subsets would add only a few more unicasts to the burden of router 121a. Some of these laggards would also add unicasts to the prior approach.

3.0 Method for Using Multicast Subsets

Figure 4B:
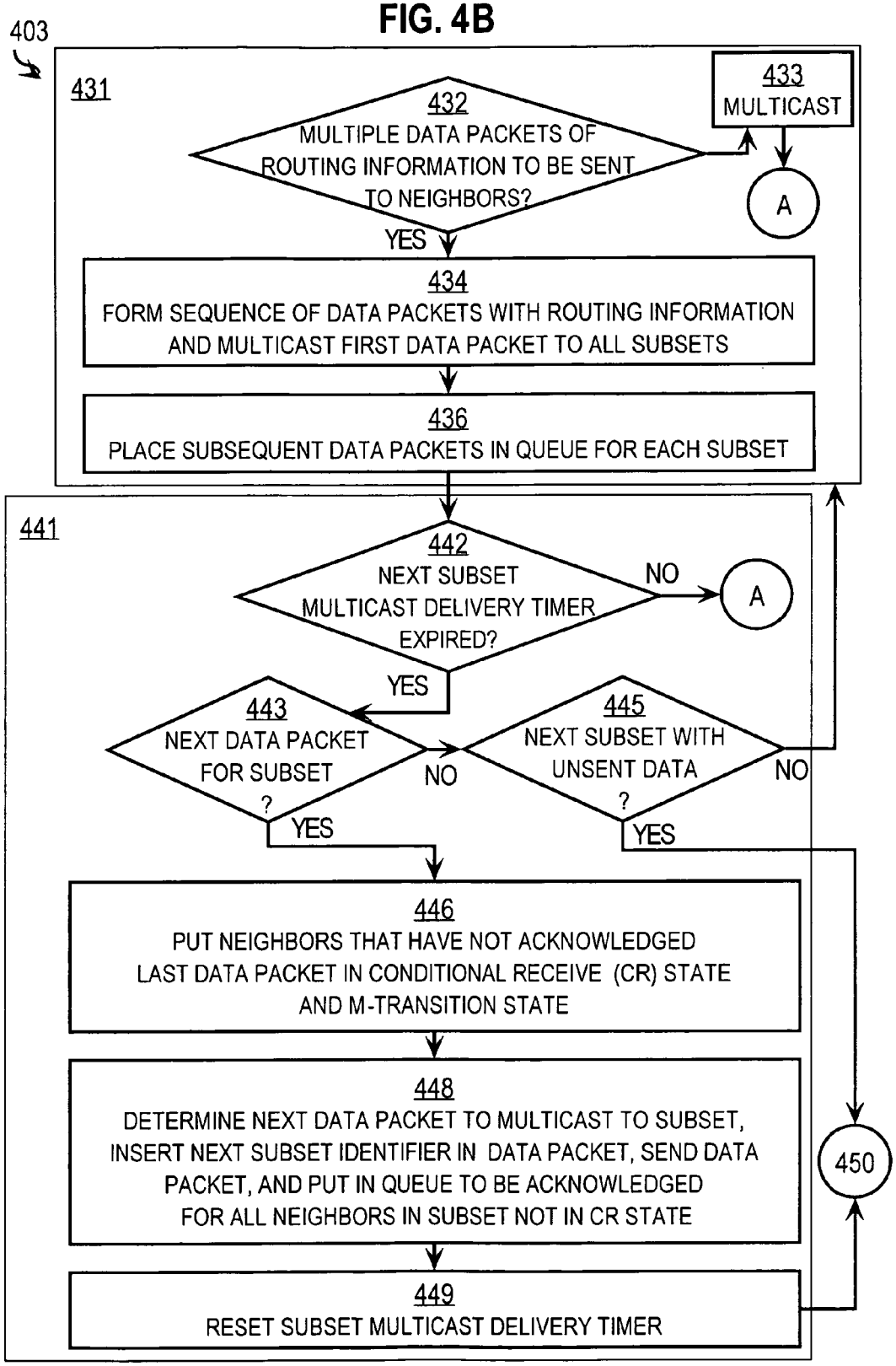
FIG. 4B and FIG. 4C constitute a flow diagram that illustrates in more detail some steps of the method of FIG. 4A, according to another embodiment.

FIG. 4A is a flow diagram that illustrates at a high level a method 400 for using multicast subsets, according to an embodiment. Although steps in FIG. 4A and subsequent flow diagrams in FIG. 4B, FIG. 4C, FIG. 5A, FIG. 5B and FIG. 6 are shown in a particular order for purposes of illustration, in other embodiments one or more steps may be performed in a different order or overlapping in time, or one or more steps may be omitted or added, or some combination of changes may be made.

3.1 Method Overview

In step 404, a router receives data that indicates function or performance of each of its neighbors. As an example of neighbor function data, router 300 receives EIGRP messages that indicates whether a neighbor is a stub or non-stub router for a particular range of IP addresses (see for example, patent application Ser. No. 11/346,781 entitled "Techniques for Decreasing Queries to Discover Routes in an Interior Gateway Protocol", filed Feb. 3, 2006, the entire contents of which are hereby incorporated by reference as if fully set forth herein). As an example of performance data, router 300 receives ACK messages from its neighbors at times that indicate one or more round trip travel times or SRTTs for those neighbors.

In step 410, multiple subsets, each including multiple neighbors, are determined based on the function or performance data. For example, during step 410 in some embodiments, stub neighbors 121b, 121c, and routers indicated by ellipsis 125a for ranges of IP addresses reached through sub-network 105 are placed in a first subset, given a first subset identifier (e.g., 20001); and non-stub stub neighbors 122a though neighbors indicated by ellipsis 125d for those same ranges of IP addresses are placed in a different second subset, given a different second subset identifier (e.g., 20002). As a further example, in some embodiments, during step 410, router 121a divides its 1000 neighboring routers into four subsets, with subset identifiers 1001, 1002, 1003, 1004 based on SRTTs based on graph 360, as described above.

In step 420, subset definition data is sent to all neighbors. For example all hosts IP multicasts (IP destination address 224.0.0.10) are sent on the segment defined by links 130 formatted as routing protocol group definition message 210 depicted in FIG. 2A. As mentioned above, it is assumed that a message 210 can hold up to 300 router identifiers (e.g., router IP addresses) in association with one subset identifier. In an example embodiment, four multicast messages 210 suffice to send subset identification data to all neighbors during step 430. A first message 210 includes data that indicates subset ID 1001 in field 212a and 300 router IP addresses in field 214a; fields 212b, 214b and fields indicated by ellipsis 215 are omitted. A second message 210 includes data that indicates subset ID 1002 in field 212a and 300 router IP addresses in field 214a. A third message 210 includes data that indicates subset ID 1003 in field 212a and 200 router IP addresses in field 214a. A fourth message 210 includes data that indicates subset ID 1004 in field 212a and 200 router IP addresses in field 214a.

In step 430 data is determined that is to be multicast to fewer than all subsets. For example, an EIGRP query for IP addresses reached by sub-network 105 is determined; this query data is to be sent only to subset 2001 of non-stub routers and is not to be sent to subset 2002 of stub routers. Therefore this query is to be sent to fewer than all subsets. Similarly, the routing update information with sequence 14123, in the example described above, is to be sent only to subset 1001 of the fastest neighbors at 500 ms, as listed in Table 1; and is not to be sent for processing by the other subsets at 500 ms.

In step 440, a multicast is sent to the neighbors of the router with a subset identifier for fewer than all subsets. For example, message 220 is sent with IP multicast address 224.0.0.10 and subset ID 2001 in field 222, an initial sequence number in field 224, and an EIGRP query in field 226. Similarly, at 500 ms, message 220 is sent with IP multicast address 224.0.0.10 and subset ID 1001 in field 222, sequence number 14123 in field 224 and the second portion of the routing update information in field 226.

Steps 430 and 440 are described in more detail for a particular embodiment below with reference to FIG. 4B and FIG. 4C.

In step 444, it is determined whether all the data to be sent to fewer than all subsets has been sent. If so, control passes back to step 440 to determine the next set of data to be sent. For example, after the query is sent to subset 2001, control passes back to step 430 to determine if there is another query or a routing update message to send to fewer than all subsets.

If it is determined in step 444 that not all data to be sent to fewer than all subsets has been sent, control passes to step 450. In step 450 it is determined whether the performance or function of a neighbor has changed sufficiently to change that neighbor's subset membership. For example, it is determined during step 450 whether a non-stub router has become a stub router; or it is determined whether a fast neighbor has become a slower neighbor. Step 450 is described in more detail below with reference to FIG. 5A and FIG. 5B.

If it is determined in step 450 that performance or function has not changed sufficiently to change subset membership, then control passes back to step 440 to send the next multicast to fewer than all subsets.

If it is determined in step 450 that performance or function has changed sufficiently to change subset membership, then control passes to step 470. In step 470, the neighbor's subset member ship is changed. Control then passes to step 480, to notify the neighbor of the changed subset. For example, a unicast is sent to the neighbor that includes a field, like field 212*a*, that indicates a new subset identifier for the neighbor.

3.2 Multicasting to Subsets Based on SRTT Times

Figure 4C:
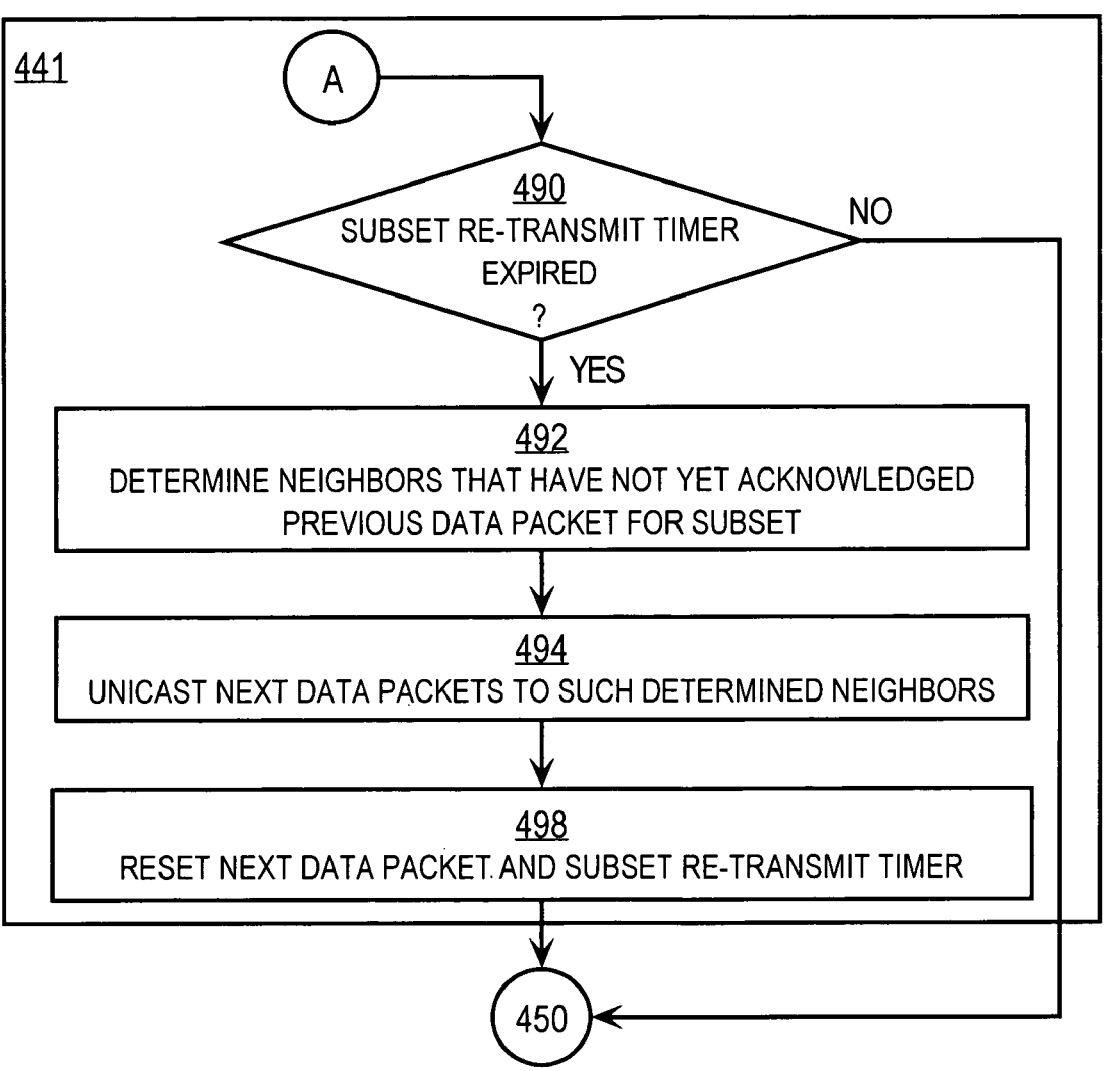

FIG. 4B and FIG. 4C constitute a flow diagram that illustrate in more detail steps 430 and 440 of the method of FIG. 4A, according to another embodiment 403. In embodiment 403, router 121*a* sends routing update information to its neighbors with varying SRTTs, as depicted in FIG. 3B. In embodiment 403, step 430 is replaced by step 431 and step 440 is replaced by step 441.

Step 431 includes steps 432, 433, 434, 436. Step 441 includes steps 442, 443, 445, 446, 448, 449 depicted in FIG. 4B and steps 490, 492, 494, 498 depicted in FIG. 4C.

In step 432, it is determined whether multiple data packets of routing information are to be sent to neighbors. If not, i.e., if a single data packet of routing information is to be sent, control passes to step 433. In step 433 the single data packet is sent as a reliable multicast for which an ACK message is required from each neighbor. Control then passes to steps indicated by connection A, described in more detail below with reference to FIG. 4B, to determine whether unicasts are to be sent to neighbors that did not send ACK messages in time.

If it is determined in step 432 that multiple data packets of routing information are to be sent to neighbors, the control passes to step 434. For example, if more routing information is to be sent than can fit in one data packet as determined by the MTU for the protocol, then it is determined in step 432 that multiple data packets are to be sent. In step 434 a sequence of data packets with increasing sequence numbers are formed with the routing information; and the first packet in the sequence is multicast to all subsets. For example, an all hosts multicast with IP address 224.0.0.10 is sent, as currently done by EIGRP.

In step 436, the subsequent data packets are placed in a queue for each subset. For example, the subsequent data packets are placed in field 348 of subset data structure 340, depicted in FIG. 3A, for all subsets. Control then passes to step 442 in step 441.

In step 442, it is determined whether the subset multicast delivery timer for the next subset has expired. In the illustrated embodiment, the multicast delivery timer for a subset is included in field 344 of subset data structure 340. The subsets may be examined in any order. In the illustrated embodiment, the subsets are examined in SRTT order from fastest to slowest subset. In the example embodiment summarized in Table 1, above, there are four subsets with data in multicast delivery timer fields that indicate times of 500 ms, 1000 ms, 1500 ms and 2000 ms, respectively. If the multicast delivery timer for the next subset has expired, control passes to step 443. If not, control passes to steps indicated by connection point A, describe below.

In step 443, it is determined if there is another data packet to be multicast to the subset. For example, it is determined whether there is a data packet in the multicast queue for the subset indicated in field 348. If not, then control passes to step 445 to determine whether there is any other subset with a data packet to be multicast.

If it is determined in step 443 that there is a data packet in the queue to be multicast to the subset, control passes to step 446. In step 446, neighbors in the subset that have not acknowledged the last multicast data are placed in the condition non-receive state, according to the conditional receive (CR) method currently employed by EIGRP. For example, a flag is set in the CR state field 336 associated with that neighbor indicating that the neighbor may not receive the next packet in the sequence of data packet of routing information. The unresponsive neighbor is also put in an m-transition state to indicate the neighbor is being considered for changing to a subset of slower neighbors. For example, a flag is set in the transition state field 335 associated with that neighbor.

In step 448, the next packet to be multicast to the subset is determined, and a value for the subset identifier is included in the packet and the packet is multicast to the neighbors. This packet will be discarded by routers that are not members of the subset whose identifier is included in the data packet. The data packet is then put into the queue of data packets to be acknowledged by each neighbor in the subset, and removed from field 348 which indicates the queue of packets to be multicast to the subset.

For example, during step 448, the routing information for the next packet in sequence to be multicast to the subset is determined from the queue of packets to be multicast in field 348 and placed in field 226 of a routing information multicast message 220. Data indicating the sequence number for the packet is placed in field 224 of message 220. A value for the subset identifier from field 342 is included in subset identifier field 222 of the message 220. Message 220 is multicast to the neighbors with an IP address of 224.0.0.10. This packet will be discarded by routers that are not members of the subset whose identifier is included in the data packet. For example, a message 220 from router 121*a* with subset 1001 in field 222 will be ignored by routers that are members of subsets 1002, 1003, 1004. The data packet sent is then put into the queue of data packets to be acknowledged by each neighbor in the subset. For example, the sequence number and routing information is removed from the queue to be multicast to a subset in field 348 and inserted into the packets not yet ACKed field 337 for each neighbor in the subset. The neighbors in the subset (e.g., in subset 1001) is determined by the contents of field 346 for the subset, or based on the contents of field 334 for each neighbor.

In step 449, the multicast delivery timer for the subset is reset. For example, the multicast delivery timer for subset 1001 is reset to 500 ms. Control then passes to step 450, shown in FIG. 4A, to determine if a neighbor has changed subset membership.

As is currently performed by EIGRP and not shown in FIG. 4A, 4B or 4C, when an ACK message is received from a particular neighbor, the packet in the corresponding field 337 for that neighbor is removed.

If it is determined during step 443 that there is not another data packet to be multicast to the subset, then control passes to step 445 to determine whether there is any other subset with a data packet to be multicast. If there is another subset with a data packet to be multicast, control first passes to step 450, shown in FIG. 4A, to determine if a neighbor has changed subset membership. If there is not another subset with a data packet to be multicast, then the multicasts to fewer than all subsets are completed, and control passes back to step 430 to determine the next routing messages to send to less than all subsets.

If it is determined in step 442, that the subset multicast delivery timer for the next subset has not expired, control passes to steps indicated by connection point A, and shown in FIG. 4C, to determine whether to unicast the routing information to one or more neighbors. The steps indicated by connection point A include steps 490, 492, 494, 498. These steps are currently performed by EIGRP for a single subset of responsive routers. Here, the methods of EIGRP are modified to work with different re-transmit timers for different subsets.

In step 490, it is determined whether the re-transmit time for the subset has expired. In the illustrated embodiment, the re-transmit timer for a subset is included in field 345 of subset data structure 340. The subsets may be examined in any order. In the illustrated embodiment, the subsets are examined in SRTT order from fastest to slowest subset. In the example embodiment summarized in Table 1, above, there are four subsets. It is further assumed for purposes of illustration that re-transmit timers hold data that indicates twice the time of the corresponding multicast delivery timer. Thus the data in re-transmit timer fields indicate re-transmit times of 1000 ms, 2000 ms, 3000 ms and 4000 ms, respectively. If the re-transmit timer for the next subset has not expired, control passes to step 450 to determine whether a neighbor has changed subset membership. If the re-transmit timer for the next subset has expired, control passes to step 492 and following steps to re-transmit a data packet via unicast to the non-responding neighbors.

In step 492, the neighbors that have not yet acknowledged a multicast data packet for a subset are determined. Any method may be used. In the illustrated embodiment, the queue of packets not yet ACKed indicated by data in field 337 for each neighbor is examined. Only neighbors that belong to the subset of the expired timer are viewed. Those neighbors are determined based on either the list of neighbors in field 348 associated with each subset, or the subset identifier in field 334 associated with each neighbor. In some embodiments, the sequence number for the data in the queue indicated by field 337 is compared to a sequence number in the CR state field 336, to determine whether the portion of the routing information not ACKed is a portion which the neighbor is supposed to ignore based on the CR method currently used by EIGRP.

In step 494, a data packet that should have been acknowledged by the particular neighbor but still appears in the queue indicated by field 337 is unicast to the neighbor in a standard routing information message, as is currently done in EIGRP.

In step 498, the re-transmit timer is reset and the packet just unicast is reset, such as by removing it from the queue indicated by field 337. Control then passes to step 450.

3.3 Changing Subset Membership

Figure 5A:
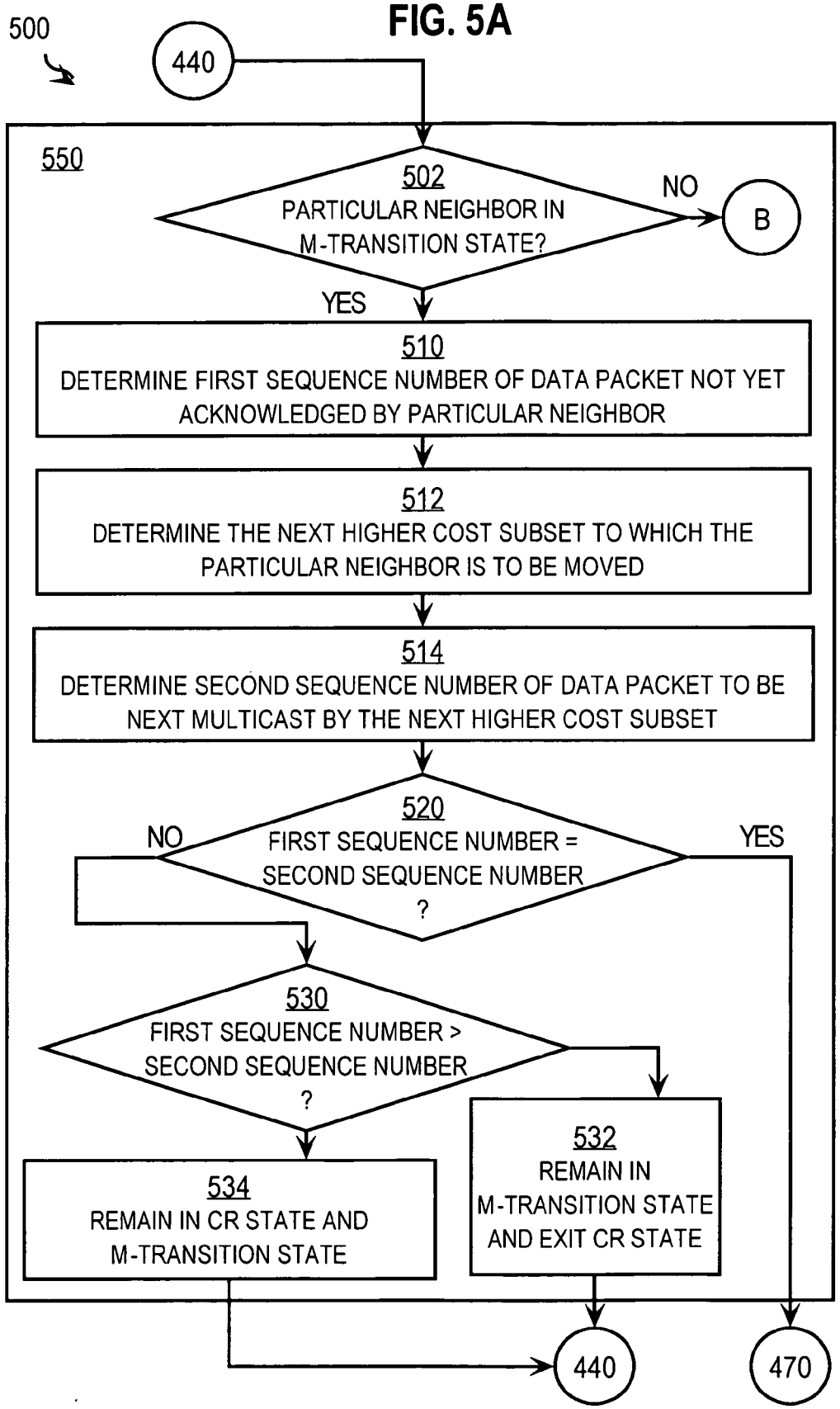
FIG. 5A and FIG. 5B constitute a flow diagram that illustrates in more detail different steps of the method of FIG. 4A, according to an embodiment.
Figure 5B:
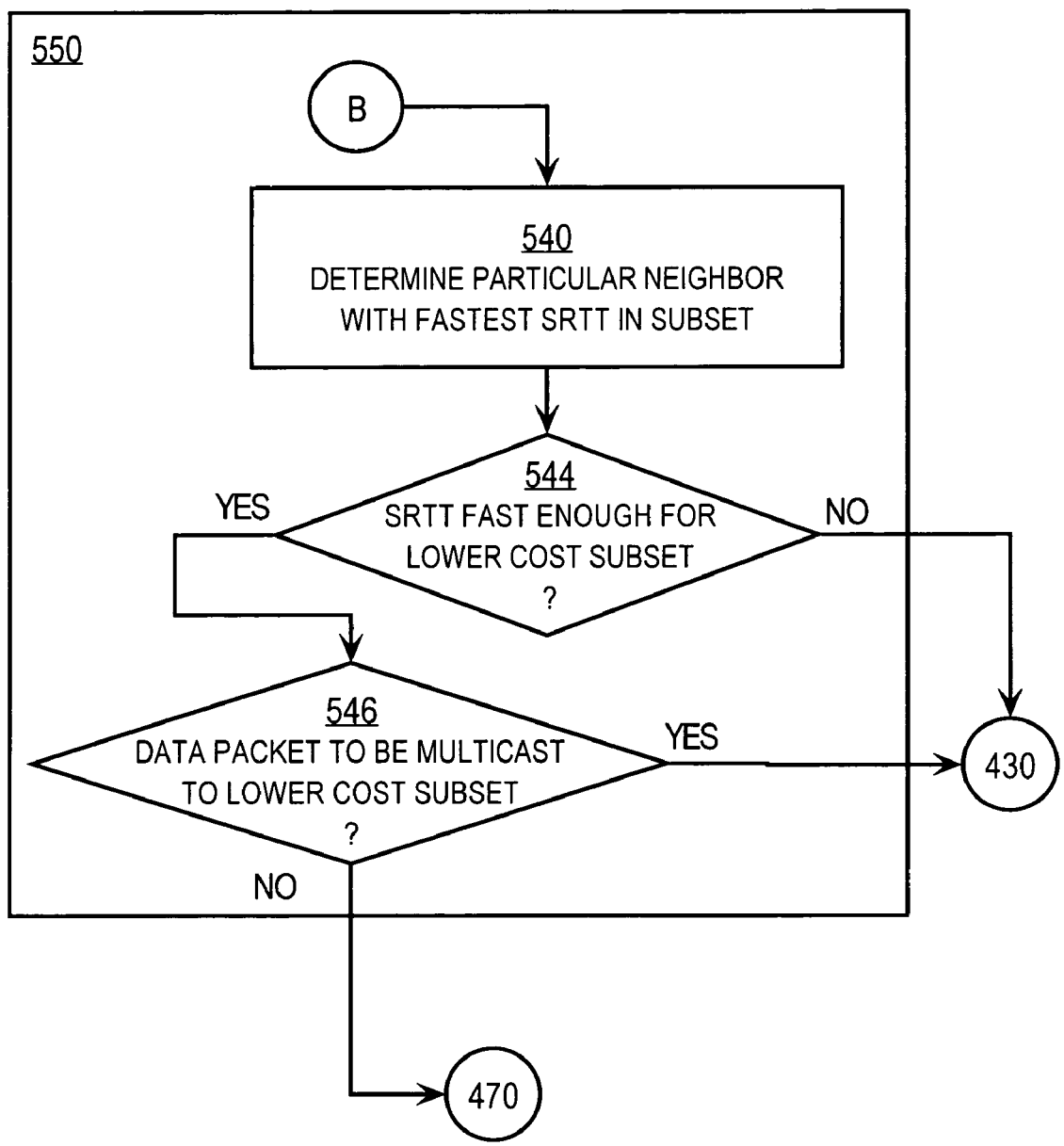

FIG. 5A and FIG. 5B constitute a flow diagram that illustrate in more detail different steps of the method of FIG. 4A, according to an embodiment 500. In embodiment 500, step 450 is replaced by step 550 to determine whether conditions are satisfied for changing subset membership based on SRTT. Step 550 includes steps 502, 510, 512, 514, 520, 530, 532, 534 and steps indicated by connection point B, including steps 540, 544, 550.

In step 502, it is determined whether a particular neighbor is in the M-transition state. For example, it is determined whether the current subset examined just before control passes to step 550 has a flag set in the transition state field 335 in neighbor data structure 300. A flag is set in transition state field 335 during step 446, as described above. If the particular neighbor is not in the M-transition state, then the neighbor is not a laggard router and control passes to steps indicated by connection point B to determine whether the neighbor is qualified to be moved to a subset associated with a lower cost (e.g., a shorter SRTT). If the particular neighbor is in the M-transition state, then the neighbor is a laggard router and control passes to step 510.

In step 510, a first comparison sequence number is determined from a multicast data packet not yet acknowledged by the particular neighbor. For example, the sequence number in the queue indicated by field 337 is determined to be the first comparison sequence number of the particular neighbor.

In step 512, a candidate subset is determined for the particular neighbor. The candidate subset is associated with higher costs of transmitting data packets. In the illustrated embodiment, the candidate subset is associated with a longer SRTT. For example, when a neighbor in subset 1002 does not acknowledge a multicast packet for that subset in time, the candidate subset for that neighbor is a slower subset, such as the next slower subset 1003 or even slower subset 1004.

In step 514, a second comparison sequence number is determined from a multicast data packet to be sent next to the candidate subset. For example, the sequence number for the first packet in the queue indicated by field 348 is determined to be the second comparison sequence number.

In step 520, it is determined whether the first comparison sequence number equals the second comparison sequence number. If so, the particular neighbor is in step with the candidate subset and control passes to step 470 to change the subset membership of the particular laggard neighbor from the current subset to the candidate subset.

If it is determined in step 520 that the first comparison sequence number does not equal the second comparison sequence number, then control passes to step 530. In step 530, it is determined whether the first comparison sequence number is greater than the second comparison sequence number. If so, then the particular laggard neighbor is ahead of the candidate subset and control passes to step 532. In step 532 the particular neighbor is put in a state so that it receives no more data packets until the candidate subset catches up to the particular laggard neighbor. In the illustrated embodiment, the particular neighbor is left in the M-transition state but removed form the CR state so that CR multicasts are ignored and further unicast packets are not sent to the particular neighbor. For example, all packets are removed from the queue indicated by field 337. In some embodiments, the queue empties eventually because of a quiescent period in the network, rather than having packets removed. For example, EIGRP does not keep packets on the queue; rather, EIGRP keeps data on the queue. EIGRP then draws from that data to build packets whenever needed—including when waiting to re-transmit data. Control then passes back to step 440 to determine when to send the next multicast or unicast.

If it is determined in step 530 that the first comparison sequence number is not greater than the second comparison sequence number, then the first comparison number is less than the second, and the particular laggard neighbor is behind the candidate subset. In some embodiments, the next higher cost subset is then made the candidate subset and control passes back to step 512. In the illustrated embodiment, the particular laggard neighbor is left in the M-transition state and left in a state to receive conditional multicasts and unicast updates. Thus the particular laggard neighbor is updated by unicast and multicast until it catches up with routing information sent to the candidate subset as determined by having matching first and second comparison sequence numbers. Control then passes back to step 440 to determine when to send the next multicast or unicast.

If it is determined during step 502 that the particular neighbor is not in the M-transition state, then the neighbor is not a laggard router and control passes to steps indicated by connection point B to determine whether the neighbor is qualified to be moved to a subset associated with a lower cost (e.g., a faster SRTT). The steps indicated by connection B are depicted in FIG. 5B and include steps 540, 544 and 550.

In step 540, a particular neighbor with the lowest cost in the subset is determined. In the illustrated embodiment, a neighbor with the fastest SRTT time in the subset is determined. In some embodiments, a particular neighbor examined during step 402 determined.

In step 544, it is determined whether the cost for the particular neighbor is low enough for a lower cost candidate subset. In the illustrated embodiment, the lower cost candidate subset is associated with a shorter SRTT. For example, when a neighbor in subset 1002 is not in the M-transition state, the candidate subset for that neighbor is a faster subset, such as the next fastest subset 1001. If not, the neighbor remains in its current subset and control passes to step 440 to determine when to send the next multicast or unicast.

If it is determined in step 544 that the cost for the particular neighbor is low enough for the candidate subset, then control passes to step 546. In step 546, it is determined whether the candidate subset has a data packet to be multicast. For example, it is determined whether the queue indicated by field 348 is not empty. If so, then the particular neighbor and the candidate subset might be out of sink, and the neighbor is not moved to membership in the candidate subset. Control passes back to step 440 to determine when to send the next multicast or unicast.

If it is determined during step 546 that the candidate subset does not have a data packet to be multicast, then control passes to step 470 to change the subset membership of the particular neighbor from the current subset to the candidate subset.

3.4 Receiving Multicasts with Subset Identifiers

FIG. 6 is a flow diagram that illustrates a method 600 for receiving a multicast data packet with a subset identifier, according to an embodiment. In step 610, a multicast subset definition message is received at a router. For example, message 210 is received at router 122a, from router 121a or from router 129.

In step 620, the receiving router determines its own subset identifier based on the message. For example, router 122a finds in message 210 its own IP address (assumed for purposes of illustration to be 15.16.22.1) within a list indicated by data in field 214a of a second message 210. The corresponding subset identifier is indicated by data in field 212a. In the example embodiment, in a message from router 121a the data in field 212a indicates the subset identifier 1002; therefore router 122a determines that it is a member of subset 1002 for router 121a. In another example embodiment, in a message from router 129 the data in field 212a indicates the subset identifier 2002; therefore router 122a determines that it is a member of subset 2002 for router 129.

In some embodiments, multiple subset definition messages are received from the same or different routers, and a receiving router may belong to different subsets. For example, router 122a is in subset 1002 for purposes of EIGRP updates from router 121a and in subset 2002 for purposes of EIGRP queries from router 121a for destinations in sub-network 105. Furthermore, router 122a is in a different subset defined by a different sending router; e.g., it is assumed for purposes of illustration that router 122a is in subset 8765 defined by router 124a.

In the illustrated embodiment, the receiving router stores one or more subset identifiers supplied by a particular router in subset identifier field 334 associated with each neighboring router identified in field 332. For example, router 122a stores the IP address of router 121a in field 332 and stores subset identifiers 1002, 2002 in field 334.

In step 630, routing information is received in a multicast message with a subset identifier. For example, a message 220 with a subset identifier field 222, a sequence number field 224, and a routing information field 226 is received at router 122a from router 121a. Any routing information may be included in routing information field 226. For example an EIGRP update or an EIGRP query is included in field 226.

In step 640, it is determined whether the subset identifier in the received message matches the subset identifier for the subset in which the receiving router belongs.

If it is determined in step 640 that the subset identifier in the received message does not match the subset identifier for the receiver from that sending router, then control passes to step 660. In step 660, the message is ignored, and control passes to step 630 to receive the next message with routing information. For example, when router 122a receives a EIGRP update message from router 121a with subset identifier 1001 indicated in field 222, it is determined in step 640 that 1001 does not match either of the two subset identifiers, 1002, 2002, for router 122a received from router 121a. Therefore control passes to step 660.

If it is determined in step 640 that the subset identifier in the received message does match the subset identifier for the receiver from that sending router, then control passes to step 650. In step 650, the message is processed. In some embodiments, the processing in step 650 includes determining whether the receiving node is in CR mode and varying the processing based on that determination, as is currently done in EIGRP. After step 650, control passes to step 630 to receive the next message with routing information. For example, when router 122a receives an EIGRP update message from router 121a with subset identifier 1002 indicated in field 222, it is determined in step 640 that 1002 does match either of the two subset identifiers, 1002, 2002, for router 122a received from router 121a. Therefore control passes to step 650 to process the message.

4.0 Implementation Mechanisms—Hardware Overview

Figure 7:
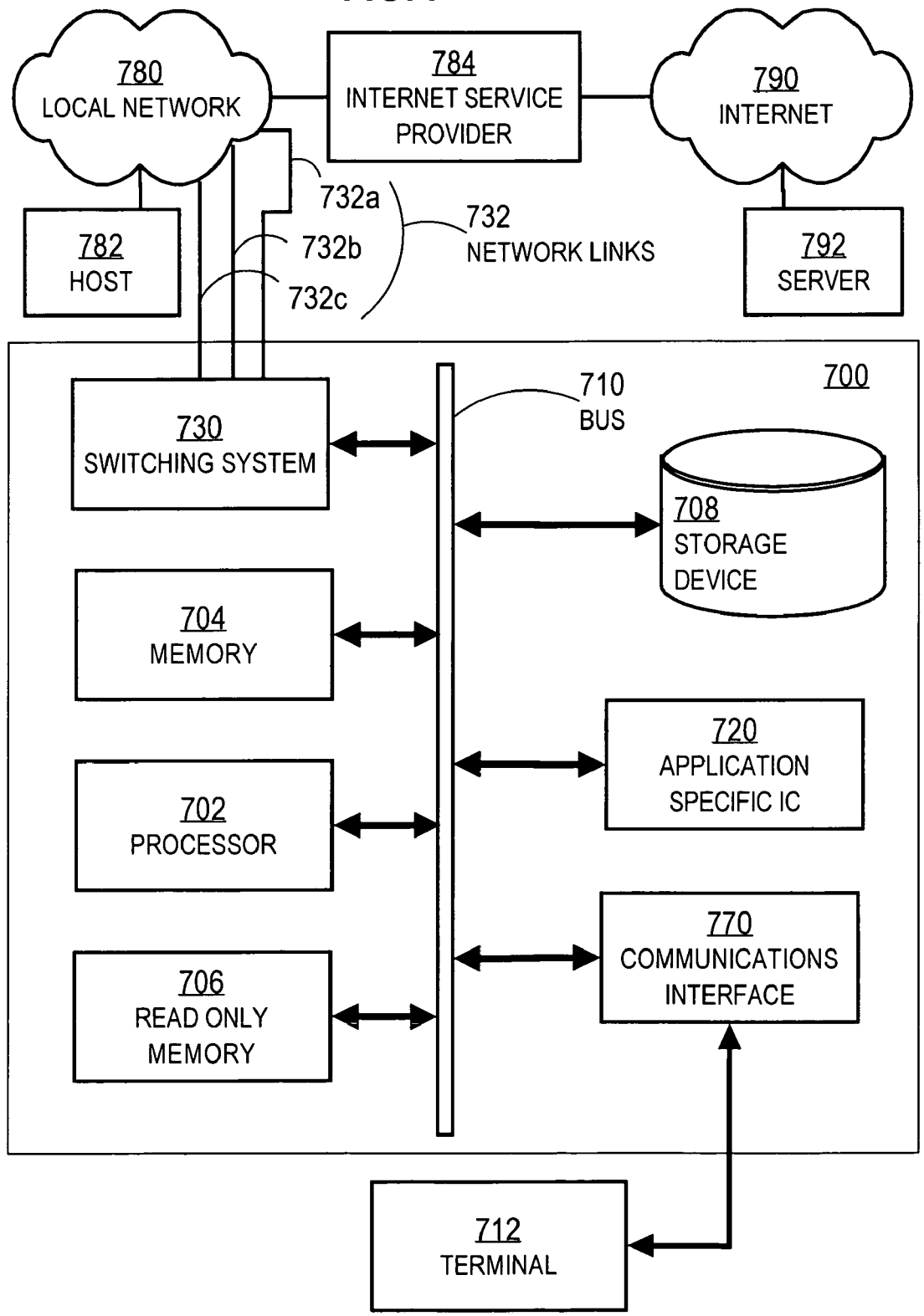
FIG. 7 is a block diagram that illustrates a router upon which an embodiment of the invention may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732a, 732b, 732c are included in network links 732 in the illustrated embodiment, in other embodiments, more or fewer links are connected to switching system 730. Network links 732 typically provides information communication through one or more networks to other devices that use or process the information. For example, network link 732b may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732a, as output on the same or different network link, e.g., 732c. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732a and send it to the correct destination using output interface on link 732c. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are exemplary forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732b through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732b. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sending data in a packet-switched communications network, comprising the steps of:
determining a plurality of subset of adjacent network nodes of a packet-switched communications network, which adjacent network nodes communicate without intervening network nodes with a particular network node through an interface on the particular network node, wherein each subset of the plurality of subsets includes a plurality of adjacent network nodes;
sending from the particular network node, through the interface, subset definition data that indicates which adjacent network nodes belong to which subset of the plurality of subsets;
sending data for fewer than all adjacent network nodes in all subsets of the plurality of subsets by including, in a multicast data packet sent over the interface with a multicast destination address, subset identifier data that indicates a particular subset of the plurality of subsets;
determining a transport cost to each adjacent network node of the adjacent network nodes;
determining a range of transport cost for each subset of the plurality of subsets;
determining whether a first transport cost of a first adjacent network node is in a first range associated with a first subset of the plurality of subsets, and if the first transport cost is in the first range, then including the first adjacent network node in the first subset;

wherein, said step of determining the plurality of subsets further comprising:
  determining a maximum number N of adjacent network nodes included in anyone subset based on a size of an identifier for an adjacent network node and a maximum size of a data packet for the interface on the particular network node; and
  including no more than N adjacent network nodes in any subset of the plurality of subsets.

2. A method as recited in claim 1, wherein:
  each of the network nodes is a router for directing data packets among multiple links based on an inter-network address; and
  the data for fewer than all adjacent network nodes is routing information for the particular subset.

3. A method as recited in claim 1, wherein the subset identifier data is a single integer.

4. A method as recited in claim 1, wherein the subset definition data comprises data that indicates:
  a first subset identifier for a first subset of the plurality of subsets; and
  a list of Internet Protocol (IP) addresses of network nodes included in the first subset.

5. A method as recited in claim 1, said step of determining the transport cost to each adjacent network node further comprising determining a smooth round-trip travel time to each adjacent network node.

6. A method as recited in claim 1, said step of determining the plurality of subsets further comprising:
  determining whether a first adjacent network node performs a first function; and
  if the first adjacent network node performs the first function, then including the first adjacent network node in a first subset; and
  if the first adjacent network node does not perform the first function, then including the first adjacent network node in a different second subset.

7. A method as recited in claim 6, said step of determining whether the first adjacent network node performs the first function further comprising determining whether the first adjacent network node is a non-stub router that has an alternative path to a particular destination inter-network address.

8. A method as recited in claim 7, said step of sending data for fewer than all adjacent network nodes further comprising sending a query for alternative routes to the particular destination by including in the multicast data packet subset identifier data that indicates the first subset, whereby the query is sent to a non-stub router that has an alternative path to the particular destination.

9. A method as recited in claim 1, said step of determining the plurality of subsets further comprising:
  determining performance of a particular adjacent network node; and
  based on the performance, removing a particular adjacent network node from a first subset of the plurality of subsets and adding the particular adjacent network node to a different second subset of the plurality of subsets.

10. A method for receiving data in a packet-switched communications network, comprising the steps of:
  receiving at a particular network node from an adjacent network node that communicates without an intervening network node, subset definition data that indicates which network nodes belong to which subset of a plurality of subsets of network nodes wherein each subset of the plurality of subsets includes a plurality of network nodes;
  determining a particular subset identifier associated with the particular router based on the subset definition data;
  receiving, in a multicast data packet, subset identifier data that indicates a first subset identifier for a first subset of the plurality of subsets;
  determining whether to process the multicast data packet based on whether the first subset identifier matches the particular subset identifier;
  determining a transport cost to each adjacent network node of the adjacent network nodes;
  determining a range of transport cost for each subset of the plurality of subsets;
  determining whether a first transport cost of a first adjacent network node is in a first range associated with a first subset of the plurality of subsets, and if the first transport cost is in the first range, then including the first adjacent network node in the first subset;
  determining a maximum number N of adjacent network nodes included in anyone subset based on a size of an identifier for an adjacent network node and a maximum size of a data packet for the interface on the particular network node; and
  including no more than N adjacent network nodes in any subset of the plurality of subsets.

11. A method as recited in claim 10, wherein:
  each of the network nodes is a router for directing data packets among multiple links based on an inter-network address; and
  the multicast data packet includes routing information for the first subset.

12. A method as recited in claim 10, wherein the subset identifier data is a single integer.

13. A method as recited in claim 10, wherein the subset definition data comprises data that indicates:
  a second subset identifier for a second subset; and
  a list of Internet Protocol (IP) addresses of network nodes included in the second subset.

14. A method as recited in claim 11, wherein the multicast data packet includes routing information that indicates a change in inter-network addresses reached by the adjacent router.

15. A method as recited in claim 10, wherein the multicast data packet includes routing information that indicates a query for an alternative route to a particular inter-network address.

16. An apparatus for determining a route in a packet-switched communications network, comprising:
  means for determining a plurality of subsets of adjacent network nodes of a packet-switched communications network, which adjacent network nodes communicate without intervening network nodes with a particular network node through an interface on the particular network node, wherein each subset of the plurality of subsets includes a plurality of adjacent network nodes;
  means for sending from the particular network node, through the interface, subset definition data that indicates which adjacent network nodes belong to which subset of the plurality of subsets;
  means for sending data for fewer than all adjacent network nodes in all subsets of the plurality of subsets by including, in a multicast data packet sent over the interface with a multicast destination address, subset identifier data that indicates a particular subset of the plurality of subsets;
  means for determining a transport cost to each adjacent network node of the adjacent network nodes;

means for determining a range of transport cost for each subset of the plurality of subsets;

means for determining whether a first transport cost of a first adjacent network node is in a first range associated with a first subset of the plurality of subsets, and if the first transport cost is in the first range, then including the first adjacent network node in the first subset;

means for determining a maximum number N of adjacent network nodes included in anyone subset based on a size of an identifier for an adjacent network node and a maximum size of a data packet for the interface on the particular network node; and means for including no more than N adjacent network nodes in any subset of the plurality of subsets.

17. An apparatus for determining a route in a packet-switched communications network, comprising:

means for receiving at a particular network node from an adjacent network node that communicates without an intervening network node, subset definition data that indicates which network nodes belong to which subset of a plurality of subsets of network nodes wherein each subset of the plurality of subsets includes a plurality of network nodes;

means for determining a particular subset identifier associated with the particular router based on the subset definition data;

means for receiving, in a multicast data packet, subset identifier data that indicates a first subset identifier for a first subset of the plurality of subsets;

means for determining whether to process the multicast data packet based on whether the first subset identifier matches the particular subset identifier;

means for determining a transport cost to each adjacent network node of the adjacent network nodes;

means for determining a range of transport cost for each subset of the plurality of subsets;

means for determining whether a first transport cost of a first adjacent network node is in a first range associated with a first subset of the plurality of subsets, and if the first transport cost is in the first range, then including the first adjacent network node in the first subset;

means for determining a maximum number N of adjacent network nodes included in anyone subset based on a size of an identifier for an adjacent network node and a maximum size of a data packet for the interface on the particular network node; and means for including no more than N adjacent network nodes in any subset of the plurality of subsets.

18. An apparatus for determining a route in a packet-switched communications network, comprising:

a network interfaces coupled to a first network for communicating therewith a first data packet;

one or more processors;

a computer-readable medium; and one or more sequences of instructions stored in the computer-readable medium, which, when executed by the one or more processors, causes the one or more processors to carry out the steps of:

determining a plurality of subsets of adjacent network nodes of a packet-switched communications network, which adjacent network nodes communicate without intervening network nodes with the network interface, wherein each subset of the plurality of subsets includes a plurality of adjacent network nodes;

sending through the network interface, subset definition data that indicates which adjacent network nodes belong to which subset of the plurality of subsets;

sending data for fewer than all adjacent network nodes in all subsets of the plurality of subsets by including, in a multicast data packet sent over the network interface with a multicast destination address, subset identifier data that indicates a particular subset of the plurality of subsets;

determining a transport cost to each adjacent network node of the adjacent network nodes;

determining a range of transport cost for each subset of the plurality of subsets;

determining whether a first transport cost of a first adjacent network node is in a first range associated with a first subset of the plurality of subsets, and if the first transport cost is in the first range, then including the first adjacent network node in the first subset;

wherein, said step of determining the plurality of subsets further comprising:

determining a maximum number N of adjacent network nodes included in anyone subset based on a size of an identifier for an adjacent network node and a maximum size of a data packet for the interface on the particular network node; and including no more than N adjacent network nodes in any subset of the plurality of subsets.

19. An apparatus as recited in claim 18, wherein:

each of the network nodes is a router for directing data packets among multiple links based on an inter-network address; and the data for fewer than all adjacent network nodes is routing information for the particular subset.

20. An apparatus as recited in claim 18, wherein the subset identifier data is a single integer.

21. An apparatus as recited in claim 18, wherein the subset definition data comprises data that indicates:

a first subset identifier for a first subset of the plurality of subsets; and a list of Internet Protocol (IP) addresses of network nodes included in the first subset.

22. An apparatus as recited in claim 18, said step of determining the transport cost to each adjacent network node further comprising determining a smooth round-trip travel time to each adjacent network node.

23. An apparatus as recited in claim 18, said step of determining the plurality of subsets further comprising:

determining whether a first adjacent network node performs a first function; and if the first adjacent network node performs the first function, then including the first adjacent network node in a first subset; and if the first adjacent network node does not perform the first function, then including the first adjacent network node in a different second subset.

24. An apparatus as recited in claim 23, said step of determining whether the first adjacent network node performs the first function further comprising determining whether the first adjacent network node is a non-stub router that has an alternative path to a particular destination inter-network address.

25. An apparatus as recited in claim 24, said step of sending data for fewer than all adjacent network nodes further comprising sending a query for alternative routes to the particular destination by including in the multicast data packet subset identifier data that indicates the first subset, whereby the query is sent to a non-stub router that has an alternative path to the particular destination.

26. An apparatus as recited in claim 18, said step of determining the plurality of subsets further comprising:

determining performance of a particular adjacent network node; and based on the performance, removing a particular adjacent network node from a first subset of the plurality of subsets and adding the particular adjacent network node to a different second subset of the plurality of subsets.

27. An apparatus for determining a route in a packet-switched communications network, comprising:

a network interfaces coupled to a first network for communicating therewith a first data packet;

one or more processors;

a computer-readable medium; and one or more sequences of instructions stored in the computer-readable medium, which, when executed by the one or more processors, causes the one or more processors to carry out the steps of:

receiving on the network interface from an adjacent network node that communicates without an intervening network node, subset definition data that indicates which network nodes belong to which subset of a plurality of subsets of network nodes wherein each subset of the plurality of subsets includes a plurality of network nodes;

determining a particular subset identifier associated with the apparatus based on the subset definition data;

receiving, in a multicast data packet, subset identifier data that indicates a first subset identifier for a first subset of the plurality of subsets;

determining whether to process the multicast data packet based on whether the first subset identifier matches the particular subset identifier;

determining a transport cost to each adjacent network node of the adjacent network nodes;

determining a range of transport cost for each subset of the plurality of subsets;

determining whether a first transport cost of a first adjacent network node is in a first range associated with a first subset of the plurality of subsets, and if the first transport cost is in the first range, then including the first adjacent network node in the first subset;

determining a maximum number N of adjacent network nodes included in anyone subset based on a size of an identifier for an adjacent network node and a maximum size of a data packet for the interface on the particular network node; and including no more than N adjacent network nodes in any subset of the plurality of subsets.

28. An apparatus as recited in claim 27, wherein:

each of the network nodes is a router for directing data packets among multiple links based on an inter-network address; and the multicast data packet includes routing information for the first subset.

29. An apparatus as recited in claim 27, wherein the subset identifier data is a single integer.

30. An apparatus as recited in claim 27, wherein the subset definition data comprises data that indicates:

a second subset identifier for a second subset; and a list of Internet Protocol (IP) addresses of network nodes included in the second subset.

31. An apparatus as recited in claim 28, wherein the multicast data packet includes routing information that indicates a change in inter-network addresses reached by the adjacent router.

32. An apparatus as recited in claim 27, wherein the multicast data packet includes routing information that indicates a query for an alternative route to a particular inter-network address.

* * * * *

UNITED STATES PATENT AND TRADEMARK OFFICE
CERTIFICATE OF CORRECTION

PATENT NO. : 7,623,474 B2  Page 1 of 1
APPLICATION NO. : 11/353544
DATED : November 24, 2009
INVENTOR(S) : Tran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Fourteenth Day of December, 2010

David J. Kappos
*Director of the United States Patent and Trademark Office*